United States Patent
Eguchi et al.

(10) Patent No.: US 8,131,962 B2
(45) Date of Patent: *Mar. 6, 2012

(54) STORAGE SYSTEM AND METHOD OF PRODUCING RECOVERY VOLUME

(75) Inventors: Yoshiaki Eguchi, Yokohama (JP); Hiroshi Arakawa, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/942,955

(22) Filed: Nov. 9, 2010

(65) Prior Publication Data

US 2011/0055506 A1    Mar. 3, 2011

Related U.S. Application Data

(63) Continuation of application No. 11/485,041, filed on Jul. 11, 2006, now Pat. No. 7,840,766.

(30) Foreign Application Priority Data

May 18, 2006   (JP) .................................. 2006-138712

(51) Int. Cl.
G06F 12/00 (2006.01)
G06F 13/00 (2006.01)

(52) U.S. Cl. ......... 711/162; 711/100; 711/154; 711/163

(58) Field of Classification Search .................. 711/100, 711/154, 162, 163

See application file for complete search history.

(56) References Cited

U.S. PATENT DOCUMENTS

| | | | |
|---|---|---|---|
| 5,321,832 A * | 6/1994 | Tanaka et al. | 1/1 |
| 6,038,639 A | 3/2000 | O'Brien et al. | |
| 7,024,514 B2 * | 4/2006 | Mukaida et al. | 711/103 |
| 7,627,712 B2 * | 12/2009 | Sanders et al. | 711/103 |
| 2004/0193945 A1 | 9/2004 | Eguchi et al. | |
| 2004/0260966 A1 | 12/2004 | Kaiya et al. | |
| 2004/0268067 A1 | 12/2004 | Yamagami | |
| 2005/0022213 A1 | 1/2005 | Yamagami | |
| 2005/0028022 A1 | 2/2005 | Amano | |

(Continued)

FOREIGN PATENT DOCUMENTS

| | | |
|---|---|---|
| JP | 2004-287648 A | 10/2004 |
| JP | 2005-18738 A | 1/2005 |
| JP | 2005-332067 A | 12/2005 |
| JP | 2006-107162 A | 4/2006 |

OTHER PUBLICATIONS

Japan Patent Office office action for patent application JP2006-138712 (May 24, 2011).

*Primary Examiner* — Tuan V. Thai

(74) *Attorney, Agent, or Firm* — Kilpatrick Townsend & Stockton LLP

(57) ABSTRACT

A storage system for writing data sent from a computer to storage regions is described. The storage system includes storage regions configured to store data, and a controller coupled with the storage regions. The controller is configured to control writing of the data from the computer. The controller is further configured to set a first storage region for writing data sent from the computer to a second storage region. The controller then acquires a snapshot of the first storage region at a predetermined time, writes a snapshot journal for the snapshot to the second storage region, and manages a snapshot management table. The controller also acquires a recovery point journal when a recovery volume designated by the computer is made, and writes the recovery point journal to the second storage region.

13 Claims, 24 Drawing Sheets

U.S. PATENT DOCUMENTS

| | | |
|---|---|---|
| 2005/0172166 A1 | 8/2005 | Eguchi et al. |
| 2005/0192991 A1 | 9/2005 | Nomoto et al. |
| 2005/0235016 A1 | 10/2005 | Amano et al. |
| 2005/0262316 A1 | 11/2005 | Obayashi et al. |
| 2006/0010300 A1 | 1/2006 | Arakawa et al. |
| 2006/0075200 A1 | 4/2006 | Satoyama et al. |

* cited by examiner

| SNAPSHOT VOLUME ADDRESS (121) | DATA WRITE ADDRESS (122) |
|---|---|
| 1 | DATA VOLUME "1" |
| 2 | DATA VOLUME "20" |
| 3 | DATA VOLUME "3" |
| ⋮ | ⋮ |
| n | DATA VOLUME "m" |

| SEQ NUMBER | ~201 |
| --- | --- |
| TIME | ~202 |
| TYPE | ~203 |
| JOURNAL DATA | ~204 |
| VOLUME NUMBER | ~205 |
| ADDRESS | ~206 |
| DATA LENGTH | ~207 |
| COMMENT | ~208 |

| 1 | ~211 |
| --- | --- |
| 2005/10/20 13:56:06 | ~212 |
| JOURNAL | ~213 |
| JOURNAL DATA | ~214 |
| VOLUME 1 | ~215 |
| 100 | ~216 |
| 20 | ~217 |
| NONE | ~218 |

| 100 | ~221 |
| --- | --- |
| 2005/10/21 14:50:46 | ~222 |
| SNAPSHOT JOURNAL | ~223 |
| - | |
| VOLUME 2 | ~224 |
| - | |
| - | |
| NONE | ~228 |

| 400 | ~231 |
| --- | --- |
| 2005/10/22 10:12:17 | ~232 |
| RECOVERY POINT JOURNAL | ~233 |
| - | |
| VOLUME 6 | ~234 |
| - | |
| - | |
| NONE | ~238 |

| RECOVERY POINT NUMBER | PRODUCTION TIME | RECOVERY VOLUME NUMBER | RECOVERY POINT JOURNAL SEQ NUMBER | EVENT |
|---|---|---|---|---|
| 1 | 2005/10/03 | VOLUME 1 | 1 | HOST COMPUTER REQUEST |
| 2 | 2005/10/03 | VOLUME 1 | 30 | VOLUME OFFLINE |
| 3 | 2005/10/04 | VOLUME 1 | 50 | HOST COMPUTER REQUEST |
| 4 | 2005/10/04 | VOLUME 1 | 60 | ISCSI LOG OFF |
| 5 | 2005/10/05 | VOLUME 3 | 100 | HOST COMPUTER REQUEST |
| 6 | 2005/10/05 | VOLUME 2 | 120 | TYPE OF ACCIDENT |
| 7 | 2005/10/06 | VOLUME 4 | 200 | HOST COMPUTER REQUEST |
| 8 | 2005/10/06 | VOLUME 2 | 265 | TIMER |

FIG.17

| RECOVERY VOLUME ADDRESS | DATA WRITE ADDRESS |
|---|---|
| 1 | DATA VOLUME "1" |
| 2 | POOL VOLUME "20" |
| 3 | DATA VOLUME "3" |
| . | . |
| . | . |
| . | . |
| n | DATA VOLUME "m" |

| RECOVERY VOLUME ADDRESS | DATA WRITE ADDRESS |
|---|---|
| 1 | DATA VOLUME "1" |
| 2 | DATA VOLUME "4" |
| 3 | DATA VOLUME "3" |
| . | . |
| . | . |
| . | . |
| n | DATA VOLUME "m" |

301 / 302 / 40

STORAGE SYSTEM AND METHOD OF PRODUCING RECOVERY VOLUME

CROSS-REFERENCES TO RELATED APPLICATIONS

This application is a continuation application of U.S. patent application Ser. No. 11/485,041, filed on Jul. 11, 2006, which claims priority from Japanese Patent Application 2006-138712, filed on May 18, 2006, the content of both of which are hereby incorporated in their entirety by reference into this application for all purposes.

BACKGROUND OF THE INVENTION

The present invention is suited to application to a storage system having a snapshot function and a journal function.

Storage systems storing data for business information systems are responsible for playing the role of data protection in the related art. As a result of the requirements of data protection, in the field of storage systems, a snapshot function and journal function have been proposed so that a replication that is a copy of data is acquired without stopping the business information system, and in the event that an accident or operation error occurs, data can be immediately restored from the replication so that a certain past state of operation is returned to (in the following, this process is referred to as "recovery").

A snapshot function is a function for making a replication by copying data of a storage region to a separate storage region at the time a storage system receives a snapshot instruction from a host computer. At the storage system, it is possible to intermittently acquire replicated data by executing a snapshot function periodically. Further, in the event of using a snapshot function, it is possible for the user to perform recovery at the point the snapshot is acquired.

A journal function is a function for producing and saving a journal from control information relating to writing and write target data when a storage system receives a write request from a host computer. Japanese Patent Laid-open Publication No. 2005-18738 discloses recovery processing executed at a point other than a point of producing a snapshot by writing data for a write target within a journal into a snapshot acquired by a snapshot function. This means that recovery is possible at a large number of points from a small number of snapshots by combining a journal function and a snapshot function.

However, the storage system of Japanese Patent Laid-open Publication No. 2005-18738 has to guarantee a physical storage region for writing data for all of the recovery targets in order to implement recovery up to the point designated by the host computer during execution of the recovery processing to the point designated by the host computer and a massive storage region is therefore required as a result.

Further, in order to execute recovery processing directly up to the point designated by the host computer for the snapshot while executing recovery to a point specified by the host computer, there is a problem in that the storage system of patent document 1 discards the snapshot, and is therefore not capable of executing recovery processing from the same snapshot.

BRIEF SUMMARY OF THE INVENTION

In order to take the aforementioned points into consideration, the present invention provides a highly reliable storage system and method for producing a recovery volume that substantially increases the operating efficiency of the storage region.

In order to resolve these problems, in the present invention, a storage system for writing data sent from host computers to storage regions comprises a storage region setting section for setting a first storage region for writing data sent from the host computers, a second storage region for writing data written to the first storage region as journal data in a manner that is identifiable in a time series, and a third storage region for writing data of the first storage region when there is a write request from a host computer for the data of the first storage region, a snapshot acquisition management section for acquiring a snapshot of the first storage region at a predetermined timing, writing a snapshot journal for the snapshot to the second storage region, and managing the snapshot management table, a recovery point acquisition section for acquiring a recovery point journal when a recovery volume designated by the host computer is made, and writing the recovery point journal to the second storage region, a snapshot management table replication section for replicating the management table for the snapshot corresponding to the snapshot journal closest to the recovery point before the recovery point journal corresponding to the designated recovery volume when making the recovery volume, and a recovery volume production section for making the recovery volume by updating the management table of the snapshot replicated by the snapshot management table replication section based on the journal data written to the second storage region from the snapshot journal to the recovery point journal corresponding to the designated recovery volume.

It is therefore possible to make a recovery volume by ensuring a physical storage region for a data portion to be written to a second storage region from a snapshot journal to a designated recovery volume without ensuring a physical storage region for a data portion written to the first storage region and third storage region and it is possible to make a recovery volume any number of times from the same snapshot management table without disruption to the snapshot management table.

Further, in the present invention, a method for making a recovery volume for a storage system for writing data sent from host computers to storage regions, comprises a first step of setting a first storage region for writing data sent from the host computers, a second storage region for writing data written to the first storage region as journal data in a manner that is identifiable in a time series, and a third storage region for writing data of the first storage region when there is a write request from a host computer for the data of the first storage region, a second step of acquiring a snapshot of the first storage region at a predetermined timing, writing a snapshot journal for the snapshot to the second storage region, and managing the snapshot management table, a third step of acquiring a recovery point journal when a recovery volume designated by the host computer is made, and writing the recovery point journal to the second storage region, a fourth step of replicating the management table for the snapshot corresponding to the snapshot journal closest to the recovery point before the recovery point journal corresponding to the designated recovery volume when making the recovery volume, and a fifth step of making the recovery volume by updating the management table of the snapshot replicated in the fourth step based on the journal data written to the second storage region from the snapshot journal to the recovery point journal corresponding to the designated recovery volume.

It is therefore possible to make a recovery volume by ensuring a physical storage region for a data portion to be written to a second storage region from a snapshot journal to a designated recovery volume without ensuring a physical storage region for a data portion written to the first storage region and third storage region and it is possible to make a recovery volume any number of times from the same snapshot management table without disruption to the snapshot management table.

According to the present invention, by replicating the management table for the snapshot corresponding to the snapshot journal closest to the recovery point before the recovery point journal corresponding to the designated recovery volume when making the recovery volume and making the recovery volume by updating the management table of the replicated snapshot based on the journal data written to the second storage region from the snapshot journal to the recovery point journal corresponding to the designated recovery volume, it is possible to make a recovery volume by ensuring a physical storage region for a data portion written to the second storage region from the snapshot journal to the designated recovery volume without ensuring a physical storage region for a data portion written to the first storage region and third storage region and it is possible to make a recovery volume any number of times from the same snapshot management table without disruption to the snapshot management table. This therefore makes it possible to implement a highly reliable storage system and method of making a recovery volume where the operating efficiency for the storage region is dramatically improved.

BRIEF DESCRIPTION OF THE DRAWINGS

FIG. 10A is an outline view illustrating a journal format.

FIG. 10B is another outline view illustrating a journal format.

FIG. 10C is another outline view illustrating a journal format.

FIG. 10D is another outline view illustrating a journal format.

FIG. 12 is an outline view illustrating a recovery point management table configuration.

FIG. 17 is an outline view illustrating a volume point management table configuration.

FIG. 18 is a further outline view illustrating a volume point management table configuration.

DETAILED DESCRIPTION OF THE INVENTION

The following is a description with reference to the drawings below of a first embodiment of the present invention.

(1) Configuration of the Storage System of the Embodiment

Figure 1:
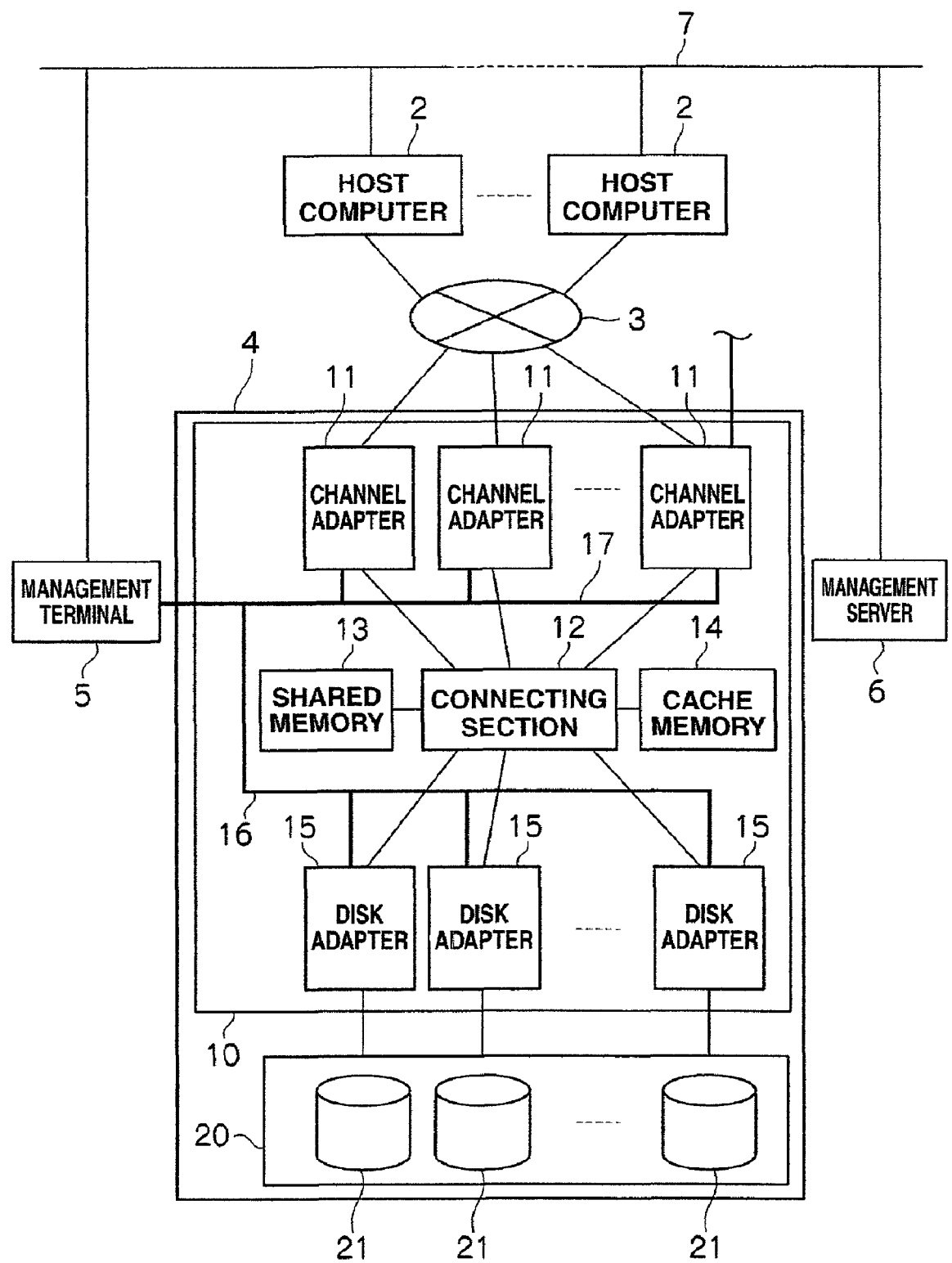
FIG. 1 is an outline view showing a configuration for a storage system of an embodiment.

FIG. 1 shows a configuration for a storage system 1 of this embodiment. This storage system 1 is configured by a plurality of host computers 2 being connected to a storage system 4 via a network 3. The storage system 1 is configured from a plurality of host computers 2, management terminal 5, and management server 6, connected via a second network 7.

The host computers 2 taken as host apparatus are computer apparatus equipped with information processing resources such as a CPU (Central Processing Unit) and memory etc., and are configured from, for example, a personal computer, work station, and mainframe computer, etc. The host computers 2 have information input apparatus (not shown) such as a keyboard, switches and pointing apparatus, and microphone etc., and also have information output apparatus (not shown) such as monitor displays and speakers etc.

The first network 3 is configured from, for example, a SAN (Storage Area Network), LAN (Local Area Network), Internet, public line, or dedicated line, etc. In the event that, for example, the first network 3 is a SAN, communication between the host computers 2 and the storage system 4 via this first network 3 is carried out in accordance with a fiber channel protocol, and in the event that the first network 3 is a LAN, communication is carried out in accordance with TCP/IP (Transmission Control Protocol/Internet Protocol). The second network 7 is configured from, for example, a LAN, Internet, public line, or dedicated line, etc. In the event that, for example, the second network 7 is a LAN, communication between the host computers 2, management terminal 5 and management server 6 is carried out in accordance with TCP/IP protocol.

The storage system 4 is equipped with a storage device 20 consisting of a control section 10 for controlling input and output of data, and a plurality of disc devices 21 for storing data.

The control section 10 is equipped with a plurality of channel adapters 11, a connecting section 12, shared memory 13, cache memory 14, and a plurality of disc adapters 15.

Each channel adapter 11 is configured from a microcomputer system equipped with a microprocessor, memory, and communication interface etc., and a port for connecting the first network 3 and other storage systems etc. The channel adapters 11 interpret each command transmitted from the host computers 2 via the first network 3 and execute corresponding processing. Network addresses (for example, IP addresses, WWN) for providing identification are allocated to the ports of each channel adapter 11, so that it is possible for each channel adapter 11 to behave individually as NAS (Network Attached Storage).

The connecting section 12 is connected to channel adapters 11, shared memory 13, cache memory 14 and disc adapters 15. The exchange of data and commands with the channel adapters 11, shared memory 13, cache memory 14 and disc adapters 15 is carried out via this connecting section 12. The connecting section 12 is configured from a switch etc. such as, for example, an ultra-high-speed cross-bus switch for transferring data using high-speed switching.

Figure 2:
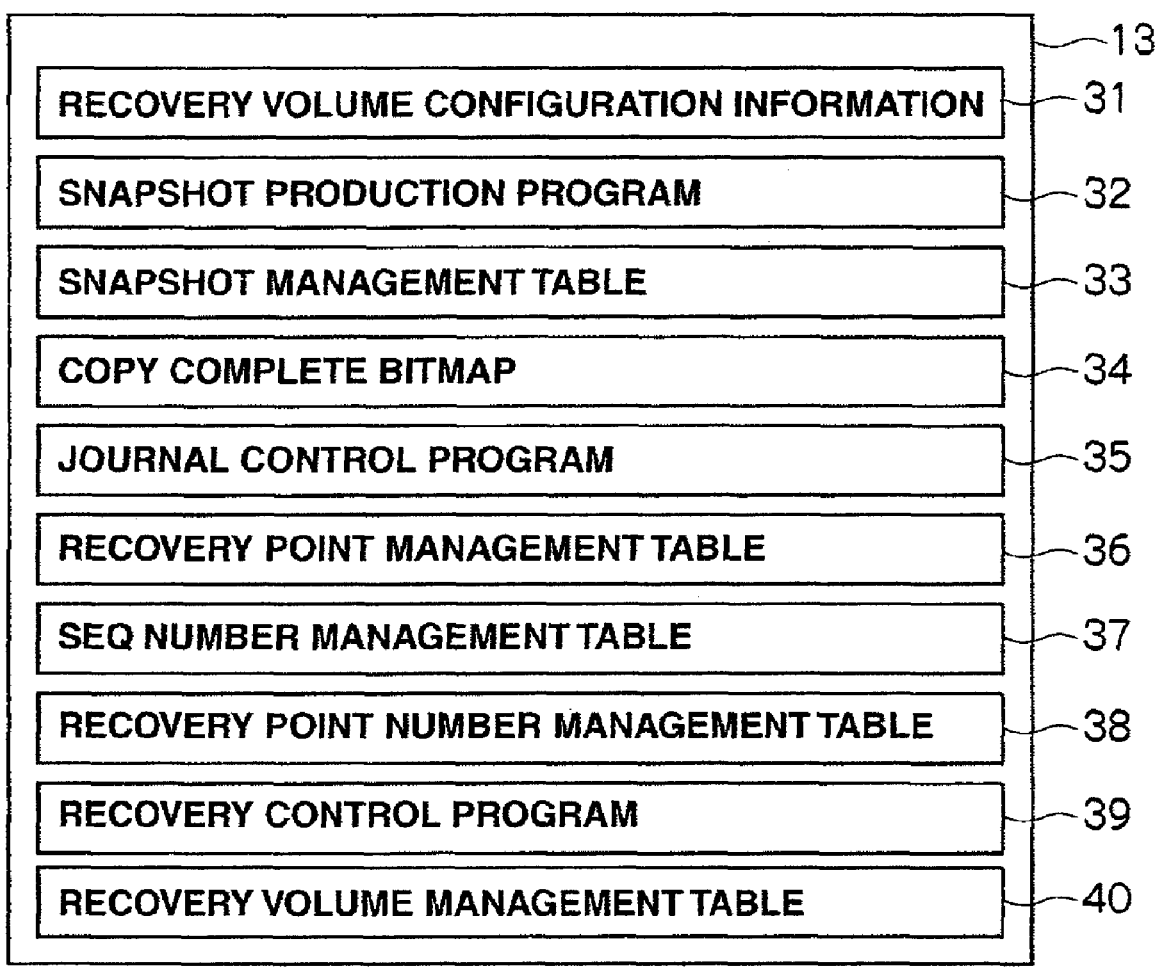
FIG. 2 is an outline view showing an outline of the contents of a shared memory configuration.

The shared memory 13 and the cache memory 14 are storage memory shared by the channel adapters 11 and disc adapters 15. As shown in FIG. 2, various system configuration information relating to the overall configuration of the storage system 4, various programs, and various tables are stored in the shared memory 13. Further, the shared memory 13 can be utilized in order to store commands such as write requests and read requests, etc. A description of the various programs and tables stored in the shared memory 13 is described in the following for this embodiment. Further, the cache memory 14 is mainly utilized in temporarily storing data that is the subject of reading and writing for inputting to and outputting from the storage system 4.

Each disc adapter 15 is configured as a microcomputer system equipped with a microprocessor and memory etc. and functions as an interface for carrying out protocol control at the time of communication with the disc devices 21 within the storage device 20. These disc adapters 15 are connected to corresponding disc devices 21 within the storage device 20 via, for example, a fiber channel cable, and exchange data with the disc devices 21 in accordance with a fiber channel protocol.

On the other hand, as well as the application of expensive discs such as, for example, SDSI (Small Computer System Interface) discs etc. or cheap discs such as SATA (Serial AT Attachment) discs or optical discs etc., utilization of semiconductor memory such as flash memory etc. other than disc devices as the disc devices 21 for the storage device 20 is also possible.

Each disc device 21 of storage device 20 may operate using a RAID (Redundant Array of Independent Disks) method using the control section 10. One or a plurality of logical volumes (in the following, these are referred to as logical volumes) are set at physical storage regions supplied by one or a plurality of disc devices 21. This data is stored in block (hereinafter referred to as "logical block") units of a predetermined size within this logical volume. Further, it is possible for a further one or a plurality of logical volumes to be set at the one or a plurality of logical volumes.

Respective unique identifiers (in the following, these are referred to as LUN's (Logical Unit Numbers)) are assigned to each logical volume. In the case of this embodiment, the input and output of data are carried out by taking a combination of this LUN and a unique logical block number (LBA: Logical Block Address) assigned to each logical block as an address, and designating this address.

The management terminal 5 is terminal apparatus for controlling the overall operation of the storage system 4 and is configured from, for example, a notebook-type personal computer. The management terminal 5 is connected to each channel adapter 11 and each disc adapter 15 via the LAN 16. The operator is capable of defining system configuration information using the management terminal 5, and is capable of writing a defined system configuration to the shared memory 13 via the channel adapter 11 or the disc adapters 15 and the connecting section 12.

The management server 6 is a computer system for managing changes in the state and configuration of the storage system 4 via the host computer 2 and the management terminal 5. The management server 6 is connected to the host computers 2 and the management terminal 16 via the second network 7 and acquires information for each control state of the storage system 4 via the host computers 2 and management terminal 5, as well as providing various instructions to the storage system 4 via the host computer 2 and the management terminal 5.

Here, a description is given of the flow of the input and output of data between the host computers 2 and the storage system 4 at the storage system 1. When an instruction indicating the writing of data to a logical volume set at the storage system 4 is inputted as a result of a user operation, the host computers 2 send a write request and data for a write target in response to this to a predetermined channel adapter 11 of the storage system 4. A virtual address that is to be written with the data of the write target consisting of a combination of virtual LU's respectively assigned to each logical volume set on storage regions supplied by the storage system 4 and virtual LBA's assigned with numbers via all of the logical blocks within the storage region is contained in this write request.

The channel adapter 11 of the storage system 4 receiving this write request then changes the virtual address for writing the data designated by the write request to a real address that can be recognized by the storage system 4. As means for achieving this, an address conversion table (not shown) correlating the actual address of the storage region supplied by the storage system 4 and the virtual address of the storage region that is recognized by the host computers 2 is stored in the shared memory 13 of the storage system 4. The channel adapter 11 then refers to this address conversion table and overwrites the virtual address the data is to be written to contained in the write request with the actual address that can be recognized by the storage system 4.

This channel adapter 11 writes this re-written data writing request to the shared memory 13. Further, the channel adapter 11 ensures a slot region for writing this data in the cache memory 14 and writes this write target data to the cache memory 14.

At this time, the disc adapter 15 continuously monitors the shared memory 13, converts the write request due to the virtual logical address designation to a write request due to the actual physical address at an appropriate timing, reads the write target data from the cache memory 14, and writes the write target data to an address position corresponding to the disc device 21 corresponding to the write target data.

On the other hand, when an instruction indicating read out data stored in a predetermined logical volume within the storage system 4 is inputted as a result of a user operation, host computer 2 sends a read request in response to this to a predetermined channel adapter 11 within the storage system 4. In this case also, a virtual address for a position where the read target data is written is contained in this read request.

A channel adapter 11 of the storage system 4 receiving this data read request then re-writes the virtual address the data is to be read out to contained in the read request to an actual address that can be recognized by the storage system 4 using the address conversion table described above.

This channel adapter 11 writes this re-written read request to the shared memory 13. Further, when it is detected that a read command is written in at the shared memory 13, the disc adapter 15 determines whether or not data of a read out target is written to within the cache memory 14, and in the event that the read out target data is written in, a read request completion response is written in to the shared memory 13. With regard to this, in the event that the data that is the target of reading out is not written in, the disc adapter 15 converts the read request due to the logical address instruction to a read request due to a physical address instruction, and reads out read out target data designated from the address position corresponding to the corresponding disc device 20 based on this address.

Further, this disc adapter 15 writes read out target data read out from this disc device 21 to the cache memory 14, and writes the read request completion response to the shared memory 13.

The channel adapter 11 then continuously monitors the shared memory 13, and when it is detected that a read request completion response is written into the shared memory 13, the channel adapter reads out the target data read out from the cache memory 14 in accordance with this read request completion response, and transmits this to the host computers 2 via the first network 3.

At this storage system 1, data sent from the host computer 2 is read from and written to the storage region supplied by the storage system 4 according to a write request or read request sent from the host computer 2.

Figure 3:
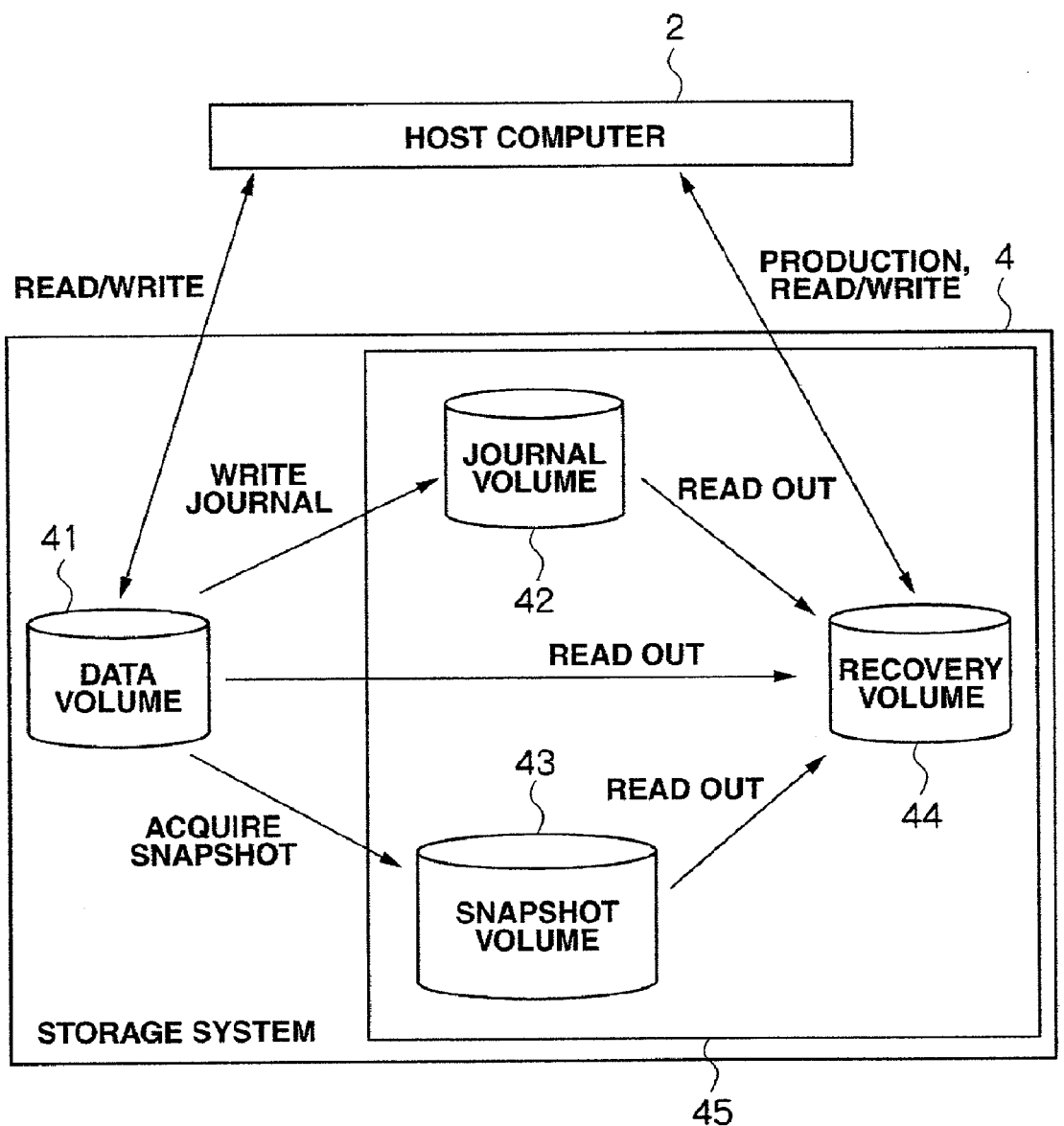
FIG. 3 is an outline view illustrating the configuration of a logical volume.

(2) A Description of Read/Write Processing to the Recovery Volume of This Embodiment The configuration of the logical volumes of this embodiment is now given. FIG. 3 shows a configuration for a logical volume of this embodiment. In this event, a logical volume 41 (hereinafter referred to as "data volume") written with write target data sent from a certain host computer 2 within the storage system, a logical volume 42 (hereinafter referred to as "journal volume") written with a journal, a logical volume 43 (hereinafter referred to as "snapshot volume") written with data of the data volume 41 for a certain time, and a logical volume 44 (hereinafter referred to as a "recovery volume") for an arbitrary time designated from the host computer 2 are set at the storage system 4. In this case, the journal volume 42, snapshot volume 43 and recovery volume 44 are set on the pool volume 45. Further, the data volume 41 and pool volume 45 are set on physical storage regions supplied by a plurality of disc devices 21.

Upon receiving a write request from the host computers 2, the storage system 4 writes write target data into the data volume 41, writes data written to the data volume 41 as a journal to the journal volume 42, and when a snapshot production request is received from host computer 2, acquires a snapshot volume 43 for the data volume 41 (described later). Further, the storage system 4 makes a recovery volume 44 based on the recovery volume production request, reads out data from the data volume 41, journal volume 42 and snapshot volume 43 based on the write request and the read request, and reads and writes to and from the recovery volume 44.

At this time, at the storage system 4, when a recovery volume instructed from host computer 2 is made, a snapshot management table 33 (described later) corresponding to a snapshot journal 220 (described later) that is closest to the designated recovery point journal for before the designated recovery point journal 230 (described later) is duplicated, and a recovery volume 44 is made by updating the snapshot management table 33 based on journal data 214 (described later) written to the journal volume 42 from the snapshot journal 220 up to the designated recovery point journal 230.

Figure 4:
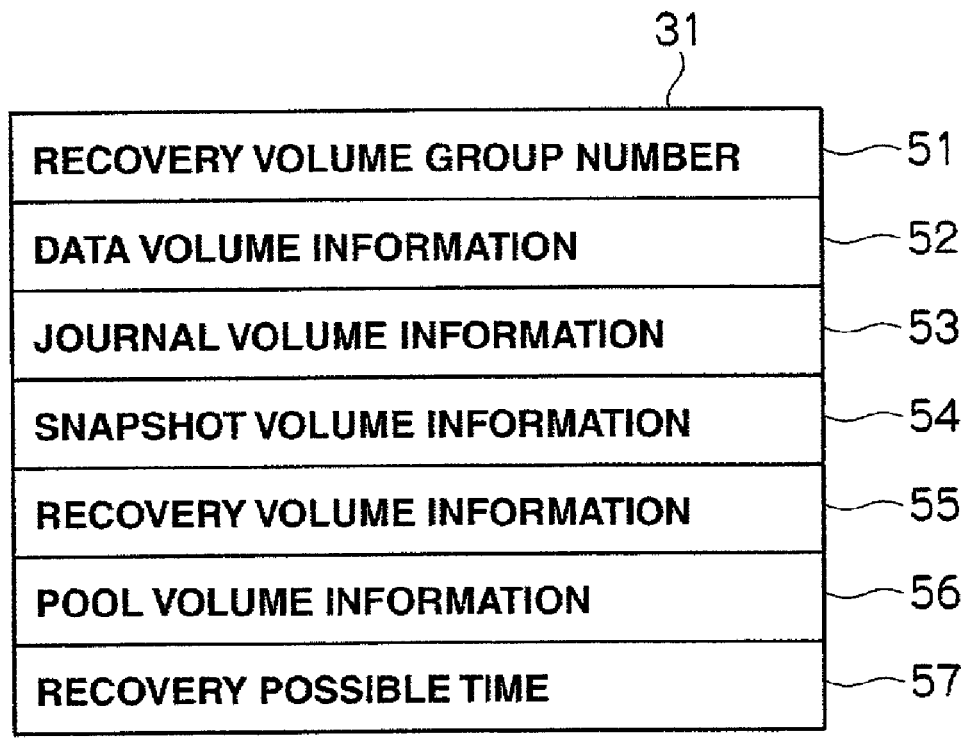
FIG. 4 is an outline view illustrating recovery volume configuration information.

Next, a description is given of configuration information for configuring the recovery volume 44 of this embodiment. FIG. 4 shows recovery volume configuration information 31 of this embodiment. As shown in FIG. 2, the recovery volume configuration information 31 is written to the shared memory 13. As shown in FIG. 4, the recovery volume configuration information 31 has a recovery volume group number 51, data volume information 52, journal volume information 53, snapshot volume information 54, recovery volume information 55, pool volume information 56, and recovery possible time 57.

The recovery volume group number 51 has an identification number for uniquely identifying the logical volume group used by each recovery volume 44 and other configuration information. The data volume information 52 has a data volume number etc. indicating an identification number for uniquely identifying a data volume 41 used by the recovery volume 44. The journal volume information 53 has a journal volume number etc. indicating an identification number for uniquely identifying a journal volume 42 used by the recovery volume 44.

Figure 5:
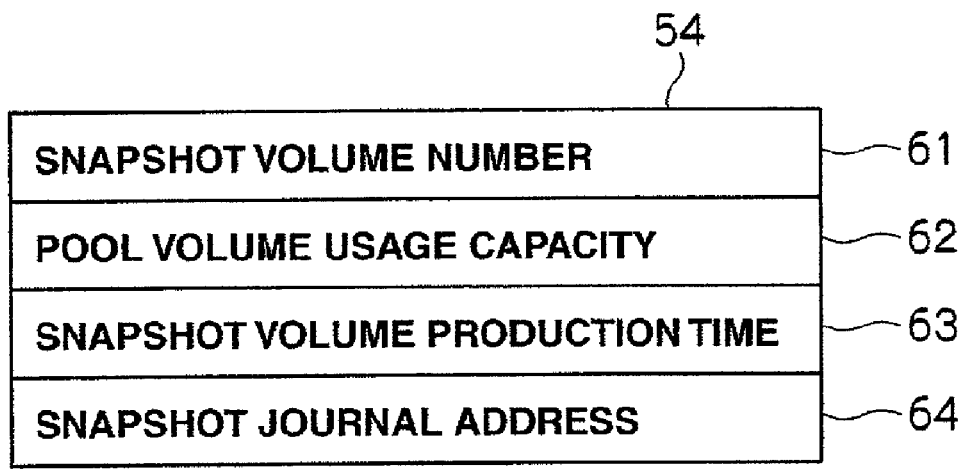
FIG. 5 is an outline view illustrating snapshot volume information.

As shown in FIG. 5, the snapshot volume information 54 has a snap volume number 61 indicating an identification number for uniquely identifying the snapshot volume 43 used by the recovery volume 44, a pool volume usage capacity 62 indicating a usage capacity of the pool volume 45 of the snapshot volume 43, a snapshot making time 63 indicating the time of making the snapshot volume 43, and a snapshot journal address 64 indicating an address of a snapshot journal of the snapshot volume 43.

Figure 6:
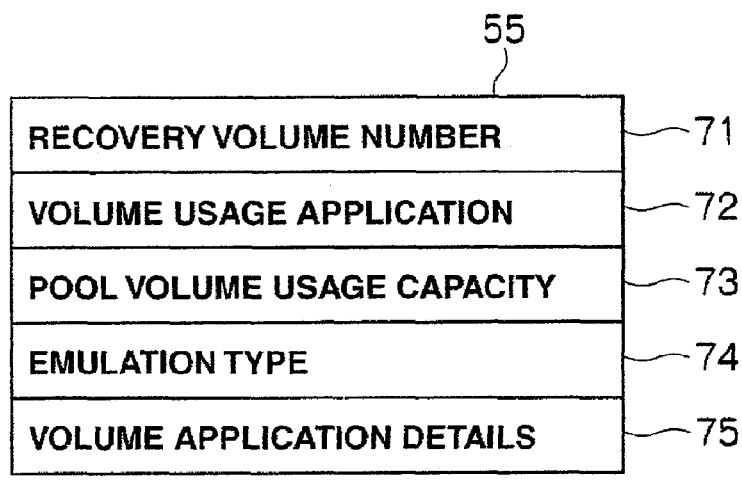
FIG. 6 is an outline view illustrating recovery volume information.

As shown in FIG. 6, the recovery volume information 55 has a recovery volume number 71 indicating an identification number for uniquely identifying the recovery volume 44, a volume usage application 72 indicating what kind of application volume the recovery volume 44 is used for the snapshot volume, volume dynamically allocating storage regions, or volume designated at an arbitrary time by host computer 2, pool volume usage capacity 73 indicating the usage volume of the pool volume 45 of the recovery volume 44, emulation type 74 indicating the emulation type of the host computer 2 using the recovery volume 44, and volume application details 75 indicating the details of application such as a snapshot volume number in the case that the recovery volume 44 is a snapshot volume, and indicating the designated time in the case that the recovery volume 44 is a volume designated by host computer 2 at an arbitrary time.

Figure 7:
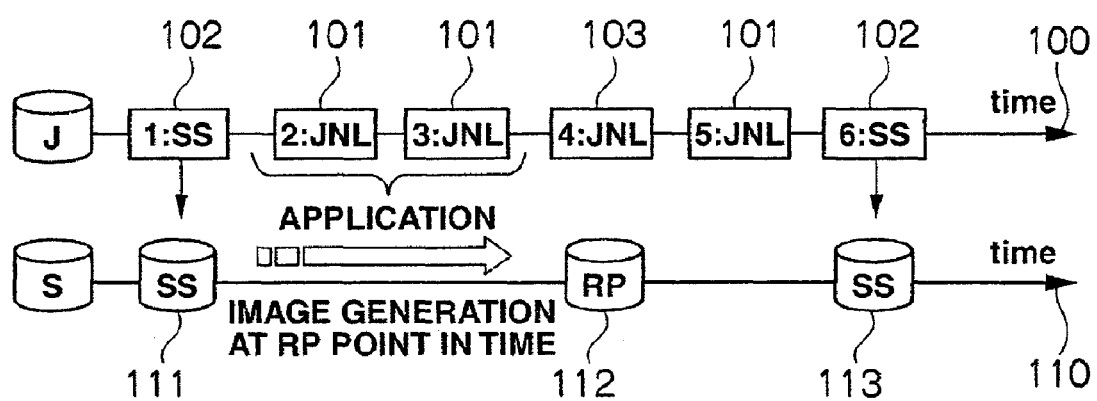
FIG. 7 is an outline view illustrating a back-up method employing a snapshot function, a journal function, and a recovery point.

The pool volume information 56 has a pool volume number etc. indicating an identification number for uniquely identifying the pool volume 45 used by the recovery volume 44. The recovery possible time 57 has the furthest time in the past that making of a recovery volume 44 is possible for. (2-1) A description is now given of each of the various functions of this embodiment. FIG. 7 schematically describes a back-up method using a snapshot function, journal function, and recovery point of this embodiment and shows a basic outline of this embodiment.

The arrow 100 of FIG. 7 indicates a time line for content of the journal volume 42, and the arrow 110 indicates a time line for the snapshot acquisition conditions.

Blocks 101, 102, and 103 shown overlapping the arrow 100 indicate journals, with one block corresponding to one journal. "JNL" shown within one block 101 means the presence of a journal made for a write request from host computer 2 at this time for a certain data volume 41. "SS" shown within block 102 means the presence of a special journal (hereinafter referred to as "snapshot journal") storing identification information etc. for the snapshot volume 43 as information relating to a snapshot in the case of acquiring a snapshot for a certain data volume 41 at this time. "RP" shown in the block 103 means the presence of a special journal (hereinafter referred to as a "recovery point journal") storing identification information etc. for the recovery volume 44 as recovery point information in the case of acquiring a recovery point for a certain data volume 41 at this time. The details of the information stored in the journal, snapshot journal, and recovery point journal are described in the following using FIG. 9.

Further, in each block of FIG. 7, the numerals shown before "SS", "JNL", and "RP" for each of the blocks of FIG. 7 show values of sequence numbers (hereinafter referred to as "SEQ number") that are continuous numbers assigned to the respective journals. The host computers 2 and storage system 4 are capable of uniquely identifying each journal using SEQ number.

Next, a description is given of snapshot volumes 111, 113 (43) and recovery volumes 112(44) shown overlapping the arrow 110 of FIG. 7. The snapshot volumes 111, 113(43) mean that acquisition of a snapshot for a certain data volume 41 at these respective points is complete and that reproduction of a data image for the data volume 41 at this time is possible. Namely, snapshot volume 111(43) is a logical volume made from acquiring a snapshot corresponding to the snapshot journal of SEQ number "1", and snapshot volume 113 (43) refers to a logical volume made from acquiring a snapshot corresponding to the snapshot journal of SEQ number "6".

The recovery volume 112 (44) shown overlapping the arrow 110 refers to acquisition of a recovery point provided with recovery processing at this point being complete, and means that it is possible to reform a data image for this recovery volume 44 in this recovery process. Namely, recovery volume 112 (44) is a logical volume corresponding to a recovery point journal of SEQ number "4", capable of being made in the event of restoring data at this point. For example, in the case of receiving a recovery processing request from a user of host computer 2 etc., data for the recovery point (recovery volume 112 (44)) is generated by sequentially writing journal data kept as journals of SEQ numbers "2" and "3" of the snapshot volume 111 (43).

Figures 8, 9:
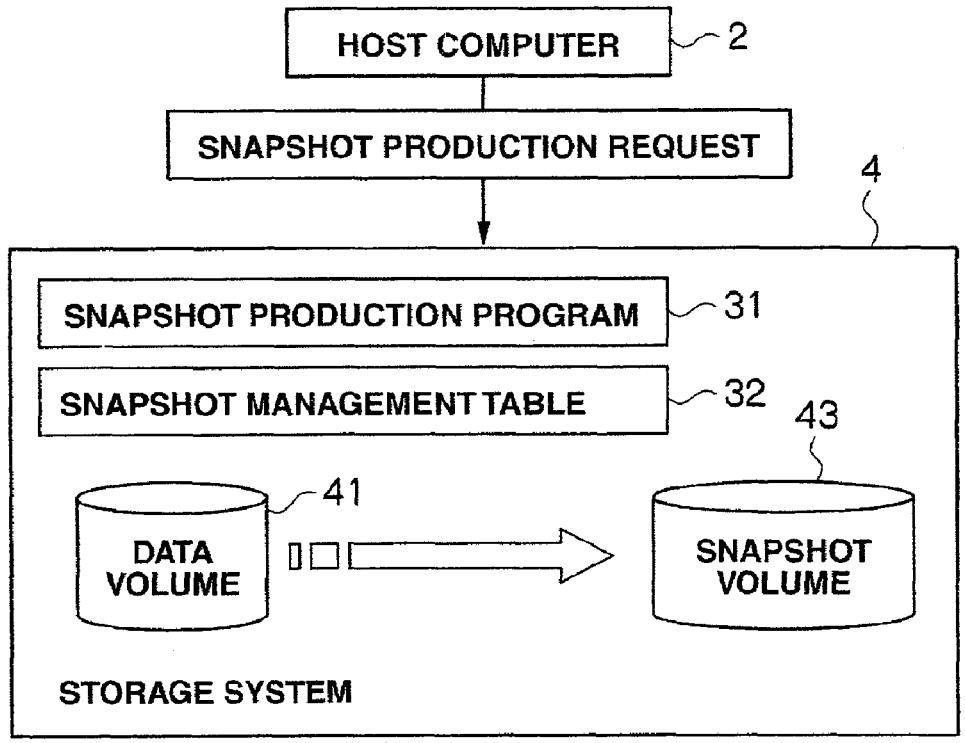
FIG. 8 is an outline view showing an outline of the snapshot function.
FIG. 9 is an outline view illustrating a snapshot management table configuration.

Next, a description is given of a snapshot function that is a software function of this embodiment. FIG. 8 shows the details of a snapshot function. The snapshot function is a function for making a replication of a data volume for a certain time as a result of the storage system 4 copying data contained in the data volume 41 to the snapshot volume 43. This replication is simply referred to as a snapshot.

The operation of making a snapshot is described in a straightforward manner using the conceptual view relating to making the snapshot shown in FIG. 8. As shown in FIG. 8, the storage system 4 has a snapshot producing program 32 for making a snapshot, a snapshot management table 33 for managing produced snapshot information, and a copy complete bitmap 34. The copy complete bitmap is information for each address within a data volume 41 indicating whether or not copying of data stored in the address to the snapshot volume 43 is complete. Here, in the event that the value of the copy complete bitmap for a certain address is "OFF", or in the event that copy complete is "ON", this is taken to indicate that copying has not yet taken place. In this event, the snapshot producing program 32, snapshot management table 33 and copy complete bitmap 34 are written into the shared memory 13, as shown in FIG. 2.

A description is now given of an operation for acquiring a snapshot. When a snapshot production request designating the data volume 41 and the snapshot volume 43 constituting a copy target is received from the host computer 2, the storage system 4 puts all of the content of the copy complete bitmap 34 to "on". Next, when data is copied from the data volume 41 to the snapshot volume 43, the storage system 4 updates the copy complete bitmap value for the address for which copying is complete to "off". Further, when a write request is received from the host computer 2, the storage system 4 refers to the copy complete bitmap 34, and if the value of the copy complete bitmap for the address that is the write target is "on", data written to the address of the target of writing from the data volume 41 to the snapshot volume 43 at this time is copied, and the copy complete bitmap is changed to "off". After copying is complete, the storage system 4 writes data that is the target of writing from the host computer 2 to the data volume 41.

As a result, the storage system 4 receives a write request from the host computer 2, and is capable of making a snapshot of the data volume 41 at the time of receiving a snapshot production request.

Further, the storage system 4 makes a snapshot based on the snapshot production request from the host computer 2 but it is also possible to make a snapshot based on a snapshot production request from the storage system 4.

Further, the storage system 4 may also have the copy complete bitmap 34 as the snapshot volume information 54. As a result, at the storage system 4, in the event that a plurality of snapshot volumes 43 are made from a single data volume 41, it is possible to simplify management of the copy complete bitmap 34 by holding respective snapshots for the copy complete bitmap 34.

FIG. 8 shows a snapshot management table 33. The snapshot management table 33 has a snapshot address 121 indicating an address of a snapshot volume, and a data write address 122 indicating the address where data of the snapshot address 121 is actually written. As a result, at the storage system 4, in the event that, for example, there is a read request for a predetermined snapshot volume 43, by referring to the snapshot management table 33 and reading data from the data volume 41 or pool volume 45, it is possible to provide a snapshot volume 43 for the host computer 2.

Next, a description is given of the details of a journal function that is a software function of this embodiment. At the storage system 4, when a snapshot function is used, it is possible to recover only data (snapshot volume 43) for the point the snapshot is made but by combining the journal function and the snapshot function, it is possible to recover data (recovery volume 44) for a large number of points from a small number of snapshots. The following is a description of an outline of an implementation method.

When a write request is received from host computer 2, the storage system 4 makes and stores a journal comprised of information relating to the writing (time and address of the target of writing etc.) and write target data using a journal function. The storage system 4 is then capable of recovering data for points other than the point of making the snapshot by writing journal data for the snapshot (hereinafter expressed as the application of a journal to a snapshot) during data recovery.

Further, at the storage system 4, there are cases where, for example, an error may be detected in an application in the possession of the host computer 2 or the making of a specific recovery point may be designated to the user of the host computer 2. With regard to this, at the storage system 4, there are cases where a specific recovery point is made based on an event detected by the storage system 4. In this way, at the storage system 4, a description is given of the case of requesting acquisition of a recovery point by the host computer or the storage system 4 at a point other than a write request from host computer 2. (The details are described in the following using FIG. 13.)

First, the host computer 2 issues a recovery point production request to the storage system 4. The storage system 4 then manages the recovery point based on the recovery point production request and controls recovery to the recovery point.

As described in FIG. 7, the storage system 4 assigns sequential numbers (SEQ numbers) to the journal corresponding to the write request, the snapshot journal produced for the point where the snapshot production request was received, and a recovery point journal made for the point where the recovery point production request was received. In the above processing, for example, a snapshot is acquired every one hour at ten o'clock and eleven o'clock, but if a recovery point is made at ten-thirty, recovery of the data for the data volume 41 at ten-thirty is possible by applying journals from directly after the snapshot journal for ten o'clock (where the SEQ number is the next journal) to the journal for directly before the recovery point journal for ten-thirty for the snapshot volume 43 acquired at ten o'clock.

The storage system 4 has the following programs and management information for recovery using a journal function. The storage system 4 has a journal control program 35 for controlling making of the journal for the write request, the snapshot journal for the snapshot production request, and the recovery point journal for the recovery point production request, and controlling deletion of the journal, snapshot journal, and recovery point journal, a recovery point management table 36 for managing recovery points, an SEQ number management table 37 for managing sequential numbers the journal is in possession of, and a recovery management program 39 for controlling recovery processing based on a recovery point management table 38 for managing numbers allocated to recovery points and recovery volume production requests from host computers 2, and controlling reading and writing to and from the recovery volume 44. In this event, the journal control program 35, recovery point management table 36, SEQ number management table 37, recovery point management table 38, and recovery management program 39 are written into the shared memory 13, as shown in FIG. 2.

Next, a description is given regarding the format of the journal. FIG. 10 shows a configuration for a journal format of this embodiment. There are three types of journals as described above: journals for write requests, snapshot journals for snapshot production requests, and recovery point journals for recovery point production requests, with the format being the same for either journal. As shown in FIG. 10(A), the journal format has an SEQ number 201, time 202, type 203, data 204, volume number 205, address 206, data length 207 and comment 208 as attributes of the journal 200.

The SEQ number 201 stores a sequence number that is a sequential number uniquely assigned to the journal, snapshot journal, and recovery point journal corresponding to the write request. The time 202 is time information where the storage system 4 updates data for the write target corresponding to a write request, time information where the storage system 4 acquires a snapshot, and time information where the storage system 4 makes a recovery point, for the respective journals.

The type 203 is information for identifying any one of the journal, snapshot journal, or recovery point journal. Identification information for a data volume 31 that is a write request target, identification information for a target data volume 31 for making a snapshot, and identification information for the recovery volume 44 of the target for making a recovery point for each respective journal is in the data volume number 205.

The data 204, address 206 and data length 207 are data updated by the write request, address information for data written to the data volume 31, and data length for the data, respectively, in the case of making a journal corresponding to the write request. In the event that the type 203 is a snapshot journal or recovery point journal, nothing is written for the data 204, address 206 and data length 207. The comment 208 is, for example, a comment inputted by a user of host computer 2, etc.

Attributes other than the attributes described above such as, for example, identification information for a snapshot volume 43 of a copy destination for the snapshot journal may also be assigned to the journal format.

FIGS. 6(B), 6(C), and 6(D) show specific examples of a journal 210, snapshot journal 220, and recovery point journal 230 for write requests. For example, snapshot journal 220 of FIG. 6(C) is a snapshot journal of an SEQ number 201 of "100", and shows acquisition of a snapshot for a data volume 31 where the volume number 205 is "2" at a time of "Oct. 10, 2005 14:50:46". These journals are made by the journal control program 35 and are written to the journal volume 42.

Figure 11:
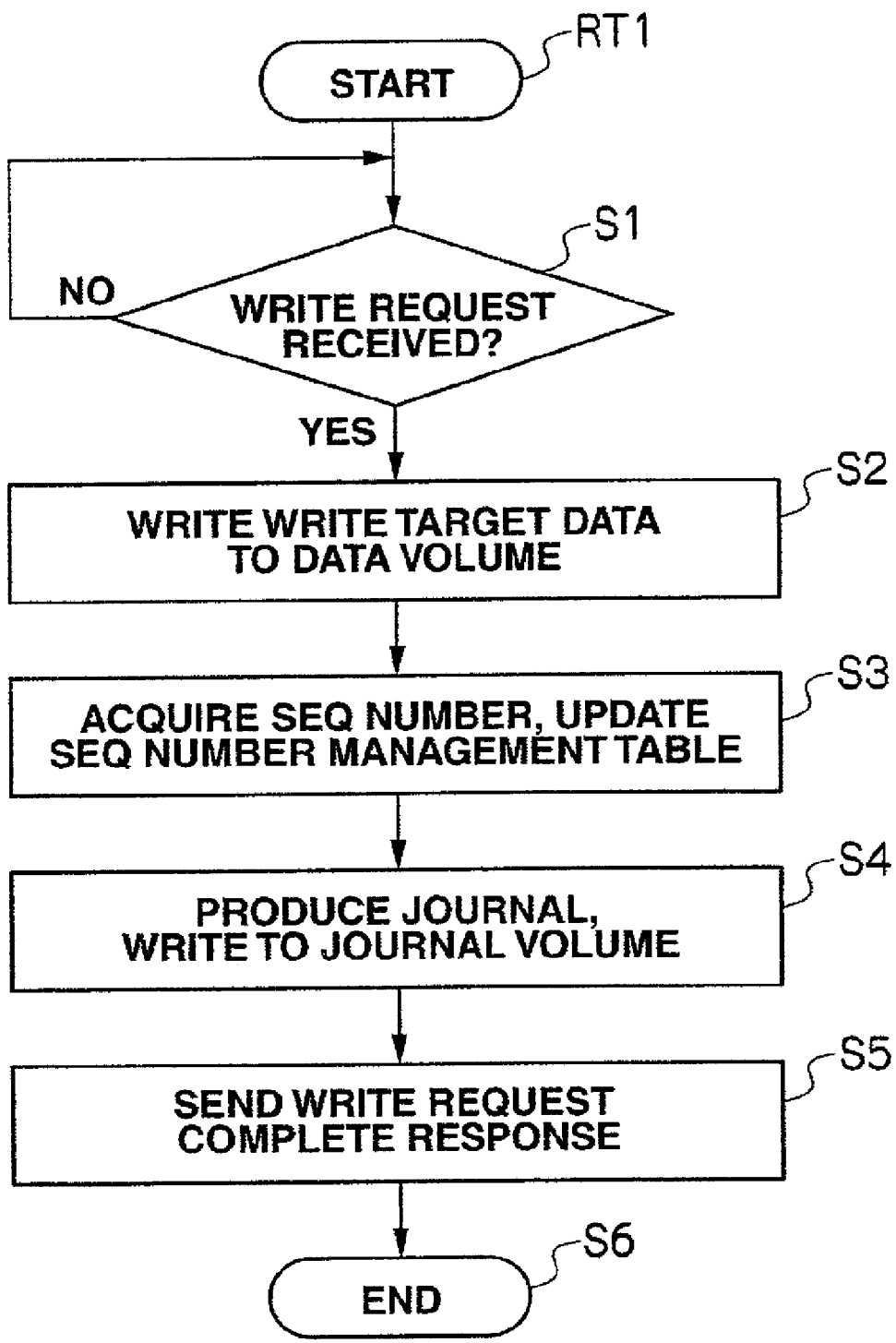
FIG. 11 is a flowchart illustrating journal production processing.

Next, a description is given of journal production processing for making a journal based on a write request from host computer 2 of the storage system 4 of this embodiment. FIG. 11 is a flowchart showing a specific processing procedure relating to the journal production processing of this storage system 4.

The channel adapter 11 of this storage system 4 awaits the receipt of a write request from host computer 2 in standby mode in accordance with a journal production processing procedure RT1 shown in FIG. 11 by executing the journal control program 35 at the time of initialization.

When a write request is received from host computer 2 (S1: YES), a channel adapter 11 writes data for the write target corresponding to the write request to the data volume 41 (S2).

The channel adapter 11 then acquires an SEQ number from the SEQ number management table 37. After this, "1" is added to the acquired SEQ number in order to prepare an SEQ number for making a subsequent journal and the SEQ number management table 37 is updated (S3).

Continuing on, the channel adapter 11 makes a journal based on the acquired SEQ number and the data etc. written to the data volume 41, and writes this journal to the journal volume 42 (S4). The channel adapter 11 then transmits a write request completion response to the host computer 2 (S5). After this, the channel adapter 11 then completes the journal production processing procedure RT1 shown in FIG. 11 (S6).

Next, a description is given of recovery point journal production processing for making a recovery point journal based on a recovery point production request from host computer 2 of the storage system 4 of this embodiment. At the storage system 4, these are divided into cases of making a recovery point journal based on a recovery point production request from host computer 2 and cases of making a recovery point (based on an event detected by the storage system 4) without a recovery point production request from host computers 2.

FIG. 12 shows the recovery point management table 36. The recovery point management table 36 has a recovery point number 241 indicating an identification number for uniquely identifying a recovery point, a production time 242 indicating the time the storage system 4 made the recovery point, a recovery volume number 243 indicating an identification number for uniquely identifying a recovery volume the recovery point journal takes as a target, a recovery point journal SEQ number 244 indicating an SEQ number of the recovery point journal, and an event 245 indicating an event detected by the storage system 4. In the event of making a recovery point journal based on a recovery point production request from host computer 2, this is written in with the "host computer request".

As a result, at the storage system 4, it is possible to recognize when, and as a result of what kind of event, and for which recovery volume 44, a recovery point is made. Nothing is written to the recovery volume number 243 before making the recovery volume 44.

Figure 13:
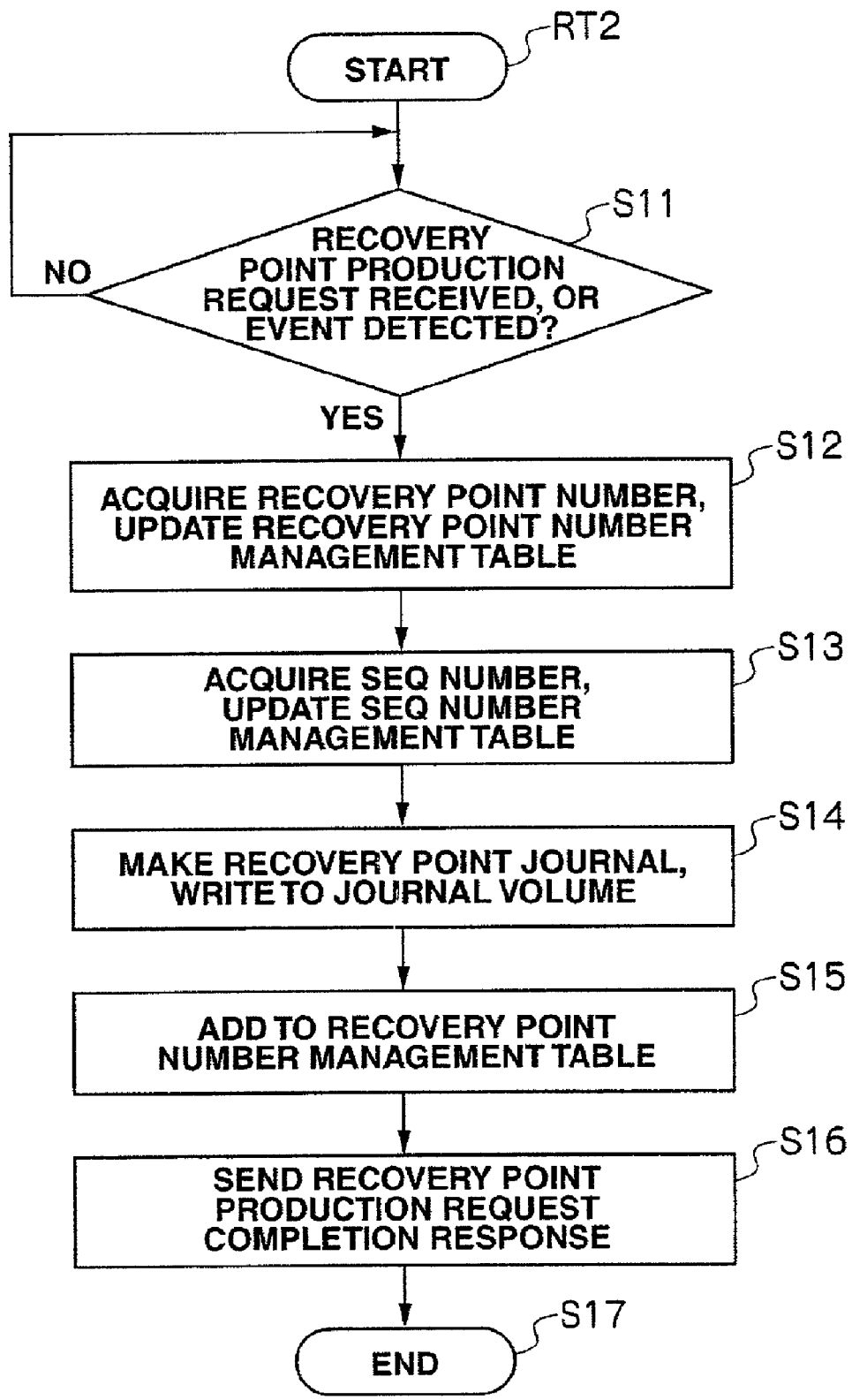
FIG. 13 is a flowchart illustrating recovery point production processing.

Here, a description is given of recovery point journal production processing for making a recovery point journal based on a write request from host computer 2 of the storage system 4 of this embodiment or detection of an event. FIG. 13 is a flowchart showing a specific processing procedure relating to the recovery point journal production processing of this storage system 4.

At the time of initialization, by executing the journal control program 35, the channel adapter 11 awaits the receipt of a recovery point production request from the host computer 2 or the detection of an event in accordance with the recovery point journal production processing procedure RT2 shown in FIG. 13 in standby mode (S11).

When a recovery point production request or an event is detected from the host computer 2 (S11: YES), the channel adapter 11 acquires the recovery point number allocated to the made recovery point from the recovery point management table 38. After this, in order to prepare a recovery point number for producing a subsequent recovery point journal, "1" is added to the acquired recovery point number, and the recovery point number management table 38 is updated (S12).

The channel adapter 11 then acquires an SEQ number from the SEQ number management table 37. After this, "1" is added to the acquired SEQ number in order to prepare an SEQ number for making a subsequent journal and the SEQ number management table 37 is updated (S13).

Continuing on, the channel adapter 11 makes a recovery point journal based on the acquired SEQ number and writes this journal to the journal volume 42 (S14). The channel adapter 11 then adds the recovery point information shown in FIG. 12 to the recovery point management table 36 based on the acquired recovery point number etc. (S15). The channel adapter 11 sends a recovery point production request completion response to the host computer 2 in the event of receiving a recovery point production request from the host computer 2 (S16). After this, the channel adapter 11 then completes the recovery point journal production processing procedure RT2 shown in FIG. 13 (S17).

(2-2) Recovery Volume Production Processing of this Embodiment

Figure 14:
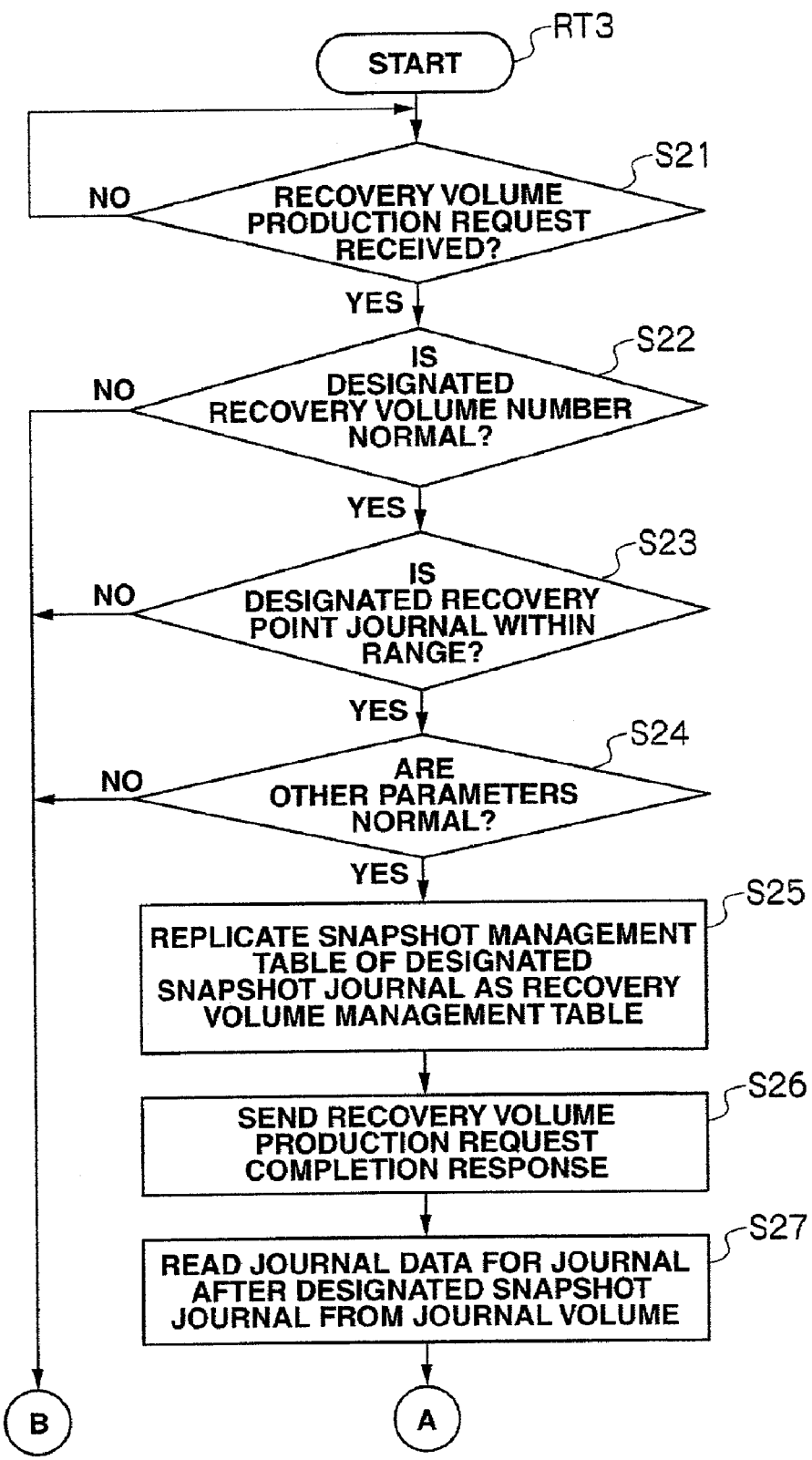
FIG. 14 is a flowchart illustrating recovery volume production processing.
Figure 15:
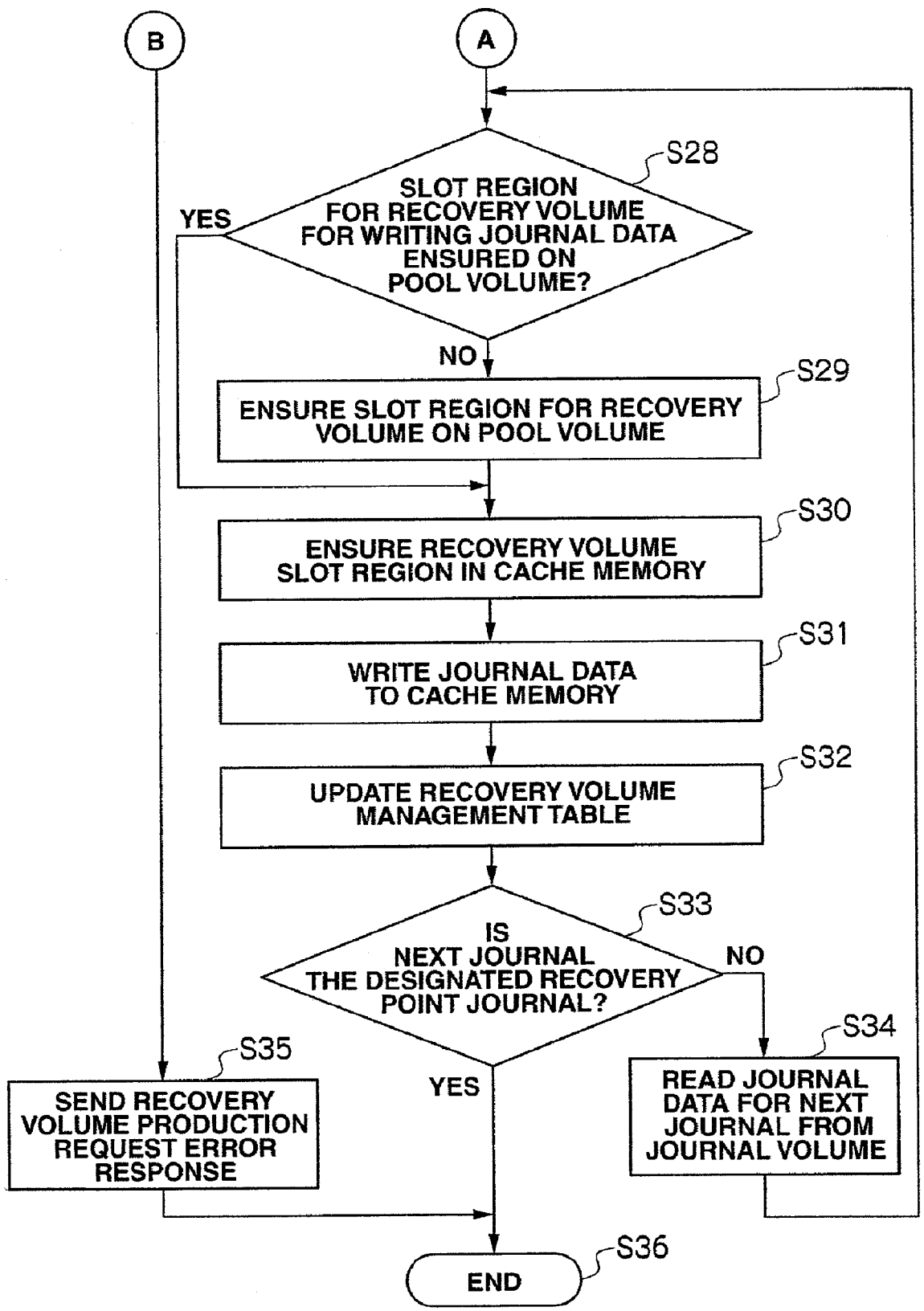
FIG. 15 is a further flowchart illustrating recovery volume production processing.
Figure 16:
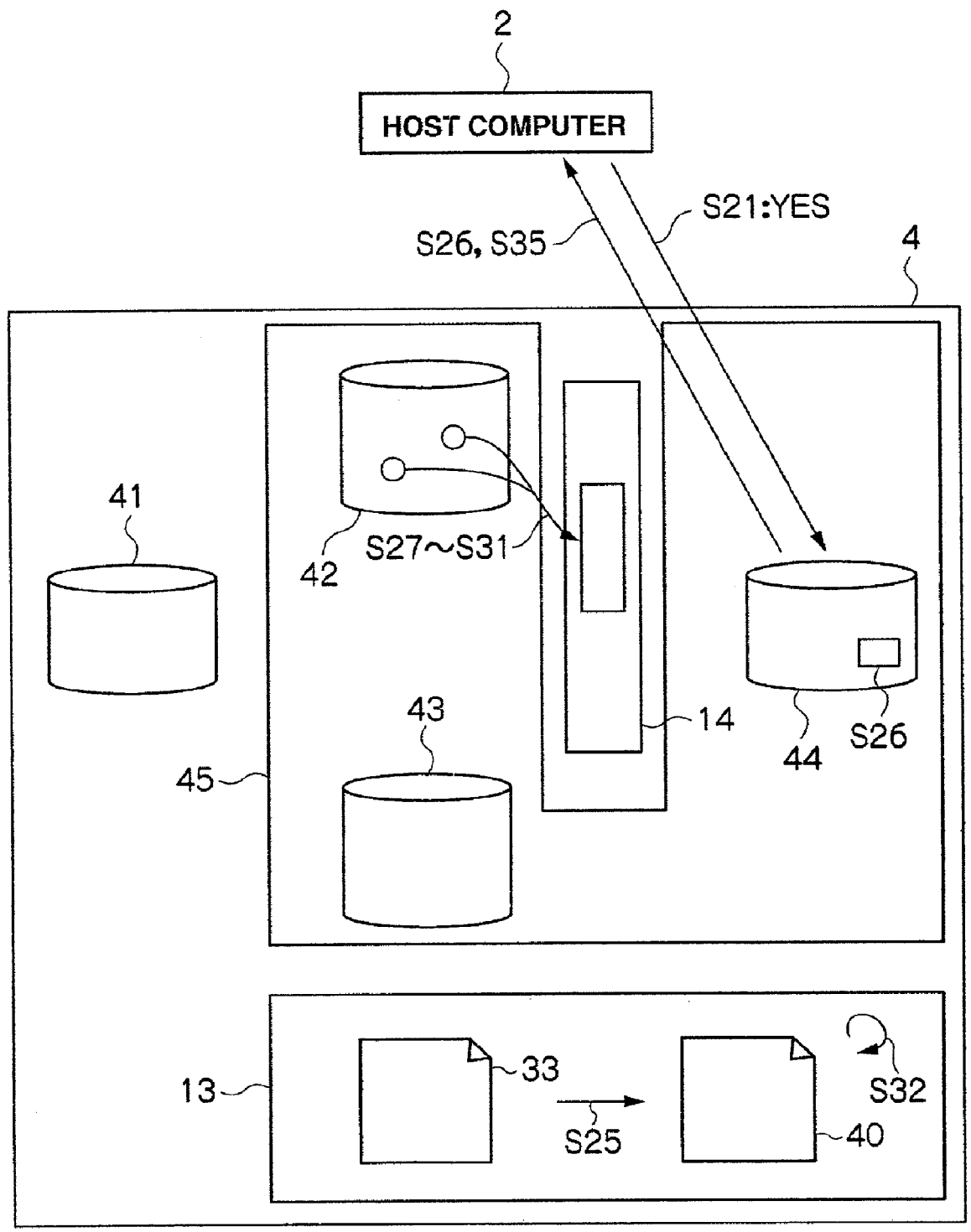
FIG. 16 is an outline view showing an outline of content of this recovery volume production processing.

Next, a description is given of recovery volume production processing for making the recovery volume 44 based on a recovery volume production request from host computer 2 of the storage system 4 of this embodiment. FIG. 14 and FIG. 15 are flowcharts showing a specific processing procedure relating to the recovery volume production processing of this storage system 4. Further, FIG. 16 is an outline view showing an outline of content of this recovery volume production processing.

A channel adapter 11 waits in standby mode for the receipt of a recovery volume production request from host computer 2 in a standby state in accordance with a recovery volume production processing procedure RT3 shown in FIG. 14 and FIG. 15 by executing the recovery management program 39 at the time of initialization (S21).

When a recovery volume production request is received from the host computer 2 (S21: YES), the channel adapter 11 checks whether or not the recovery volume number designated by the recovery volume production request is normal (S22). In the event that the recovery volume number designated by the recovery volume production request is normal (S22: YES), a check is made as to whether or not the recovery point journal 230 designated by the recovery volume production request is within the range of the recovery possible time 57 of the recovery volume configuration information 31 (S23). In the event that the time of making the recovery volume 44 is within the range of the recovery possible time 57 of the recovery volume configuration information 31 (S23: YES), the channel adapter 11 checks as to whether or not parameters other than the recovery volume production request are normal (S24).

In the event that parameters other than the recovery volume production request are normal (S24: YES), the channel adapter 11 replicates the snapshot management table 33 of the snapshot journal 220 that is the closest to the position of the designated recovery point journal 230 before the recovery point journal 230 designated by the recovery volume production request as the recovery volume management table 40 (S25). In this event, the recovery volume management table 40 is written to the shared memory 13 as shown in FIG. 2 and FIG. 16.

FIG. 17 shows the recovery volume management table 40. The recovery volume management table 40 has a recovery volume address 301 indicating the address of the recovery volume 44 and a data write address 302 indicating the address the data of the snapshot address 301 is actually written to. In order to replicate the snapshot management table 33, the recovery volume management table 40 is such that the correspondence of the recovery volume address 301 and the data write address 302 is constant with regard to the correspondence of the snapshot volume address 121 and the data write address 122.

The channel adapter 11 then sends the recovery volume production request completion response to the host computer 2 (S26). In this way, after replication as the recovery volume management table 40, the channel adapter 11 sends a recovery volume production request completion response to the host computer 2. After this, it is possible to rapidly produce the recovery volume 44 by executing actual recovery volume production processing and it is possible to improve responsiveness with respect to the host computer 2.

With regard to this, in the event that the recovery volume number designated by the recovery volume production request is not normal (S22: NO), in the event that the time of making the recovery volume 44 is not within the range of the recovery possible time 57 of the recovery volume configuration information 31 (S23: NO), or in the event that other parameters for the recovery volume production request are not normal (S24: NO), the channel adapter 11 sends a recovery volume production request error response to the host computer 2 (S35), after which the recovery volume production processing procedure RT3 shown in FIG. 14 and FIG. 15 is complete (S36).

Continuing on, the channel adapter 11 then retrieves a journal before the recovery point journal 230 designated by the recovery volume production request and after the snapshot point journal 220 that is the closest position to the designated recovery point journal 230, and reads the journal data 214 of the journal 210 from the journal volume 42 (S27).

Continuing on, the channel adapter 11 checks whether or not a slot region of the recovery volume 44 for writing the journal data 214 of the journal 210 read out from the journal volume 42 is ensured in the pool volume 45 (S28). In the event that a slot region of the recovery volume 44 for writing the journal data 214 of the journal 210 is not ensured in the pool volume 45 (S28: NO), the channel adapter 11 ensures a slot region of the recovery volume 44 for writing the journal data 214 of the journal 210 in the pool volume 45 (S29).

In the event that a slot region of the recovery volume 44 for writing the journal data 214 of the journal 210 is ensured at the pool volume 45 (S28: YES), or in the event that a slot region of the recovery volume 44 for writing the journal data 214 of the journal 210 is ensured at the pool volume 45 (S29), the channel adapter 11 ensures a slot region of the recovery volume 44 at the cache memory 14 so as to correspond to a slot region of the recovery volume 44 ensured at the pool volume 45 (S30).

Continuing on, the channel adapter 11 writes journal data 214 of the journal 210 read out from the journal volume 42 to the region corresponding to the slot region of the recovery volume 44 of the cache memory 14 (S31).

Next, the channel adapter 11 updates the recovery volume management table 40 by changing the data write address 302 of the recovery volume management table 40 to the address of the pool volume 45 at the slot region of the recovery volume 44 corresponding to the written region of the cache memory 14 (S32).

For example, in the event that the recovery volume address 301 of the slot region of the recovery volume 44 corresponding to the written region of the cache memory 14 is "2", and the address of the pool volume 45 at the slot region of the recovery volume 44 corresponding to the written region of the cache memory 14 is "pool volume "4"", the recovery volume management table 40 is updated by changing "pool volume "20"" of the data write address 302 of the recovery volume management table 40 to "pool volume "4"".

As a result, in the event that there is a read request for the data "2" at the recovery volume address 301 of the recovery volume 44, the channel adapter 11 refers to the recovery volume management table 40, and it is possible to read out data from the pool volume 45 of an ensured data write address 302 corresponding to the slot region of the recovery volume 44 of "pool volume "4"".

Continuing on, the channel adapter 11 retrieves the next journal of the journal 210 reading out the journal data 214, and checks whether or not the next journal is the recovery point journal 230 designated by the recovery volume production request (S33).

In the event that the next journal is not the recovery point journal 230 designated by the recovery volume production request (S33: NO), the channel adapter 11 reads the journal data 214 of the next journal 210 from the journal volume 42 (S34). After this, a check is once more made as to whether or not a slot region of the recovery volume 44 for writing the journal data 214 of the journal 210 read out from the journal volume 42 is ensured in the pool volume 45 (S28). The same processing is then repeated (S28 to S34-S28).

In the event that the next journal is a recovery point journal 230 designated by the recovery volume production request (S33: YES), the channel adapter 11 completes production of the recovery volume 44, and the recovery volume production processing procedure RT3 shown in FIG. 14 and FIG. 15 is complete (S36).

(2-3) Processing for Writing to the Recovery Volume of This Embodiment

Figure 19:
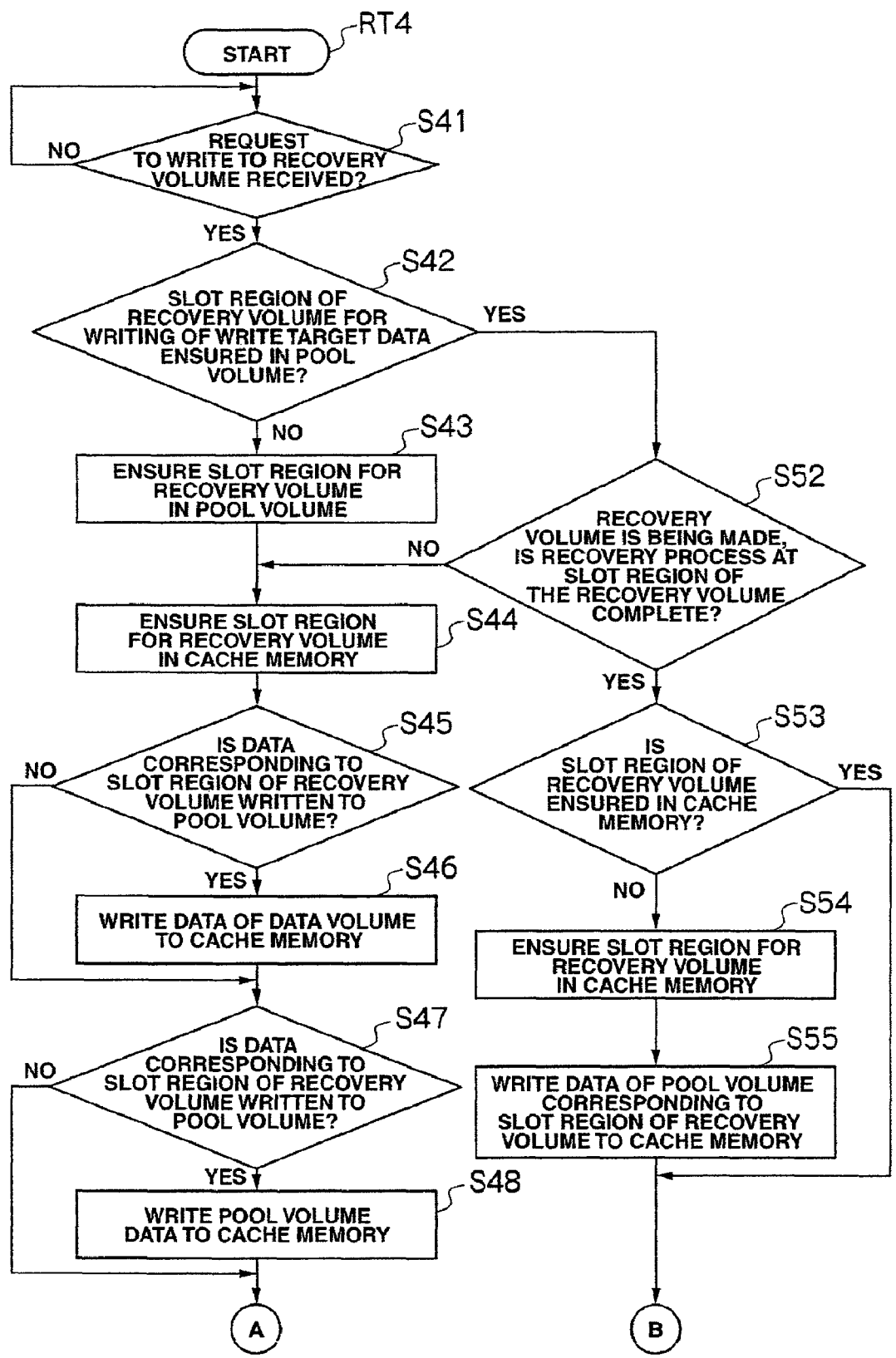
FIG. 19 is a flowchart illustrating recovery volume write processing.
Figure 20:
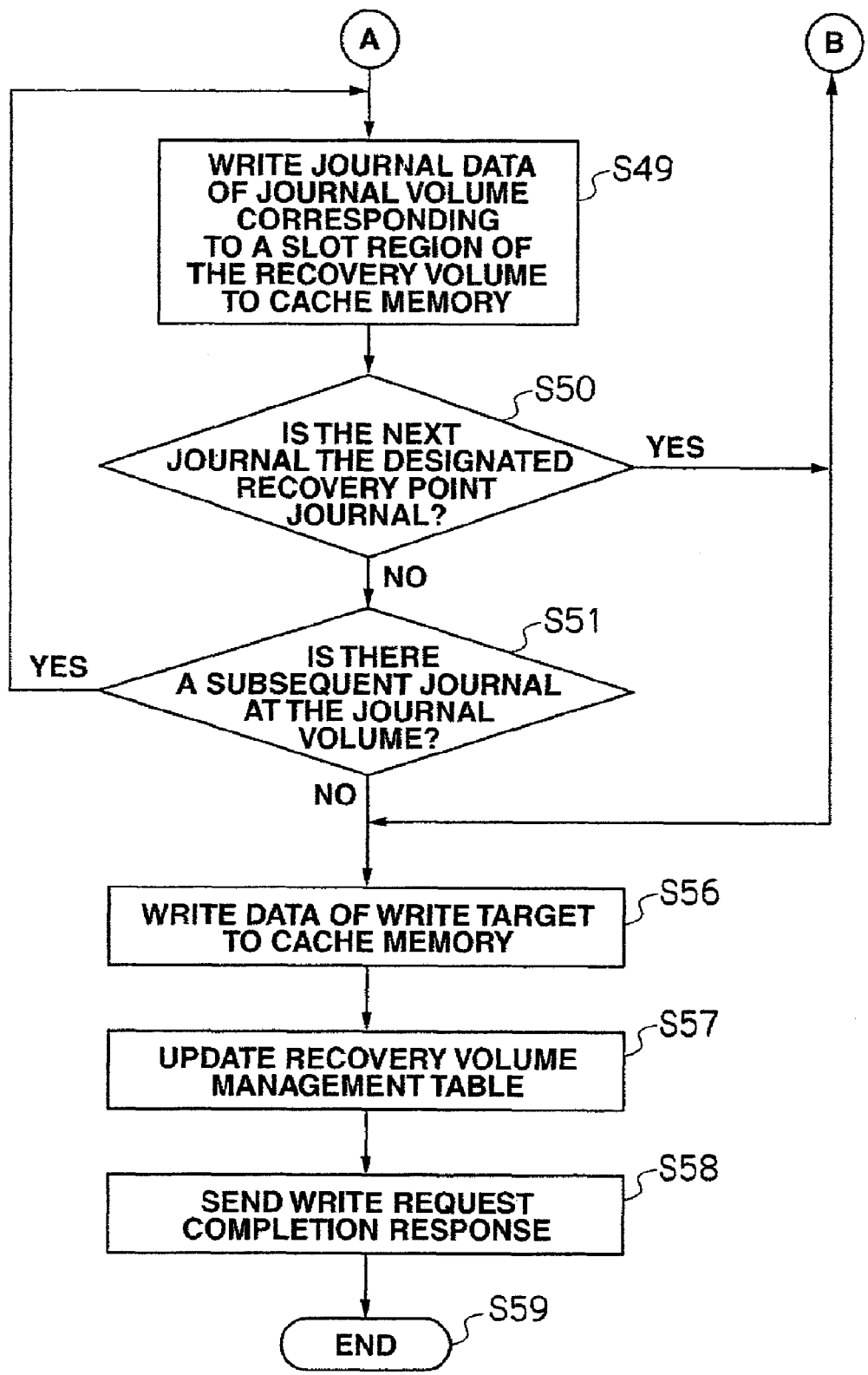
FIG. 20 is a further flowchart illustrating recovery volume write processing.
Figure 21:
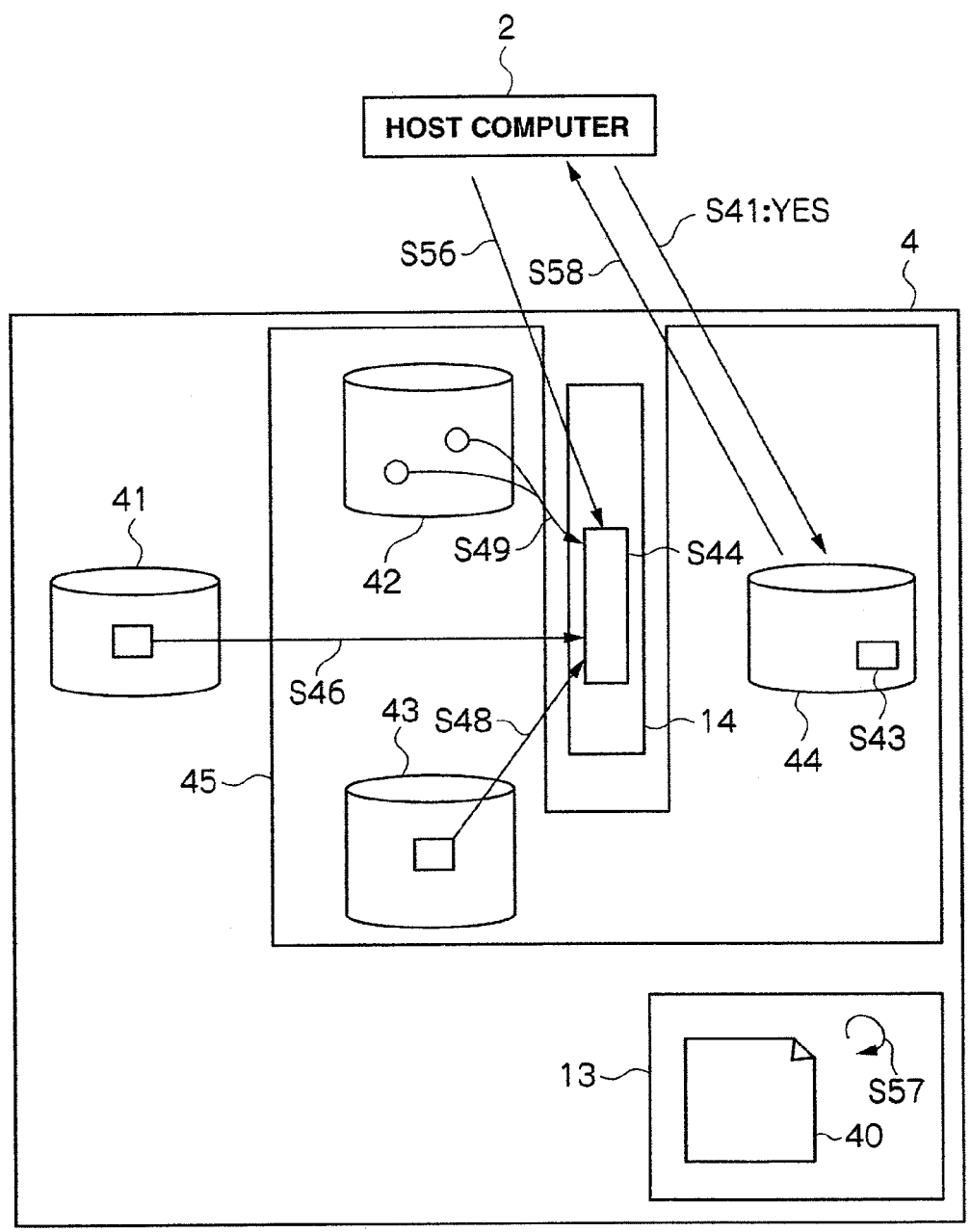
FIG. 21 is an outline view showing an outline of content of this recovery volume write processing.

A description is now given of recovery volume write processing for writing data of a write target to the recovery volume 44 based on a write request from host computer 2 of the storage system 4 to the recovery volume 44 of this embodiment. FIG. 19 and FIG. 20 are flowcharts showing a specific processing procedure relating to the recovery volume write processing of this storage system 4. Further, FIG. 21 is an outline view showing an outline of content of this recovery volume write processing.

A channel adapter 11 awaits the receipt of a write request to the recovery volume 44 from host computer 2 in a standby state in accordance with a recovery volume write processing procedure RT4 shown in FIG. 19 and FIG. 20 by executing the recovery management program 39 at the time of initialization (S41).

When a request to write to the recovery volume 44 is received from host computer 2 (S41: YES), the channel adapter 11 checks whether or not a slot region for the recovery volume 44 for writing the write target data is ensured in the pool volume 45 (S42). In the event that a slot region of the recovery volume 44 for writing data of the write target is not ensured in the pool volume 45 (S42: NO), the channel adapter 11 ensures a slot region of the recovery volume 44 for writing the write target data in the pool volume 45 (S43).

In the event that a slot region of the recovery volume 44 for writing the data of the write target is ensured at the pool volume 45 (S42: YES), or in the event that a slot region of the recovery volume 44 for writing the data of the write target is ensured at the pool volume 45 (S43), the channel adapter 11 ensures a slot region of the recovery volume 44 at the cache memory 14 so as to correspond to a slot region of the recovery volume 44 ensured at the pool volume 45 (S44).

The channel adapter 11 then refers to the recovery volume management table 40, and checks whether or not data corresponding to the slot region of the recovery volume 44 is written to the data volume 41 (S45). In the event that data corresponding to the slot region of the recovery volume 44 is written to the data volume 41 (S45: YES), the channel adapter 11 reads out data of the corresponding data volume 41 and writes this data to the region corresponding to the slot region of the recovery volume 44 of the cache memory 14 (S46).

With regard to this, in the event that data corresponding to the slot region of the recovery volume 44 is not written to the data volume 41 (S45: NO), or in the event that data of the corresponding data volume 41 is written to a region corresponding to the slot region of the recovery volume 44 of the cache memory 14 (S46), the channel adapter 11 refers to the recovery volume management table 40, and checks whether or not data corresponding to the slot region of the recovery volume 44 is written to the pool volume 45 (S47). In the event that data corresponding to the slot region of the recovery volume 44 is written to the pool volume 45 (S47: YES), the channel adapter 11 reads out data of the corresponding pool volume 45 and writes this data to the region corresponding to the slot region of the recovery volume 44 of the cache memory 14 (S48).

With regard to this, in the event that data corresponding to the slot region of the recovery volume 44 is not written to the pool volume 45 (S47: NO), or in the event that data of the corresponding pool volume 45 is written to a region corresponding to the slot region of the recovery volume 44 of the cache memory 14 (S48), the channel adapter 11 writes journal data 214 of the journal 210 corresponding to the slot region of the recovery volume 44 from the journal volume 42 to a region corresponding to the slot region of the recovery volume 44 of the cache memory 14 (S49).

Continuing on, the channel adapter 11 retrieves the next journal of the journal 210 reading out the journal data 214, and checks whether or not the next journal is the recovery point journal 230 designated by the recovery volume production request (S50).

In the event that the next journal is not a recovery point journal 230 designated by the recovery volume production request (S50: NO), the channel adapter 11 checks whether or not there is a subsequent journal in the journal volume 42 (S51). In the event that there is a subsequent journal in the journal volume 42 (S51: YES), the channel adapter 11 then again writes journal data 214 of the journal 210 corresponding to the slot region of the next recovery volume 44 from the journal volume 42 to a region corresponding to the slot region of the recovery volume 44 of the cache memory 14 (S49), and the same processing is repeated thereafter (S49 to S51-S49).

With regard to this, in the event that a slot region for the recovery volume 44 for writing the data that is the target of writing is ensured in the pool volume 45 (S42: YES), the recovery volume 44 is being made, and the channel adapter 11 therefore checks whether or not recovery processing is finished for a slot region of the recovery volume 44 for writing data that is the target of writing (S52).

In the event that recovery processing has not finished for the slot region of the recovery volume 44 for writing the data that is the target of writing (S52: NO), the channel adapter 11 ensures the slot region for the recovery volume 44 in the cache memory 14 in a manner corresponding with the slot region of the recovery volume 44 ensured in the pool volume 45 (S44), and after this, the same processing is repeated (S44 to S51-S49).

In the event that recovery processing is complete for the slot region of the recovery volume 44 for writing data that is the target of writing (S52: YES), the channel adapter 11 checks whether or not a slot region of the recovery volume 44 is ensured at the cache memory 14 (S53). In the event that a slot region of the recovery volume 44 is not ensured in the cache memory 14 (S53: NO), the channel adapter 11 ensures a slot region for the recovery volume 44 in the cache memory 14 (S54).

With regard to this, in the event that a slot region is ensured at the cache memory 14 (S53: YES), or in the event that a slot region for the recovery volume 44 is ensured in the cache memory 14 (S54), the channel adapter 11 refers to the recovery volume management table 40, and writes data of the pool volume 45 corresponding to the slot region of the recovery volume 44 to a region corresponding to the slot region of the recovery volume 44 of the cache memory 14 (S55).

In the event that the next journal is a recovery point journal 230 designated by a recovery volume production request (S50: YES), there is no subsequent journal in the journal volume 42 (S51: NO), or in the event that data for the pool volume 45 corresponding to the slot region of the recovery volume 44 is written to the cache memory 14 (S55), the channel adapter 11 writes data for the write target sent from the host computer 2 to a region corresponding to the slot region of the recovery volume 44 of the cache memory 14 (S56).

Continuing on, the channel adapter 11 updates the recovery volume management table 40 by changing the data write address 302 of the recovery volume management table 40 to the address of the pool volume 45 at the slot region of the recovery volume 44 corresponding to the written region of the cache memory 14 (S57).

The channel adapter 11 then sends the write request completion response for the recovery volume 44 to the host computer 2 (S58). After this, the channel adapter 11 then completes the recovery volume write processing procedure RT4 shown in FIG. 19 and FIG. 20 (S59).

(2-4) Processing for Reading to the Recovery Volume of this Embodiment

Figure 22:
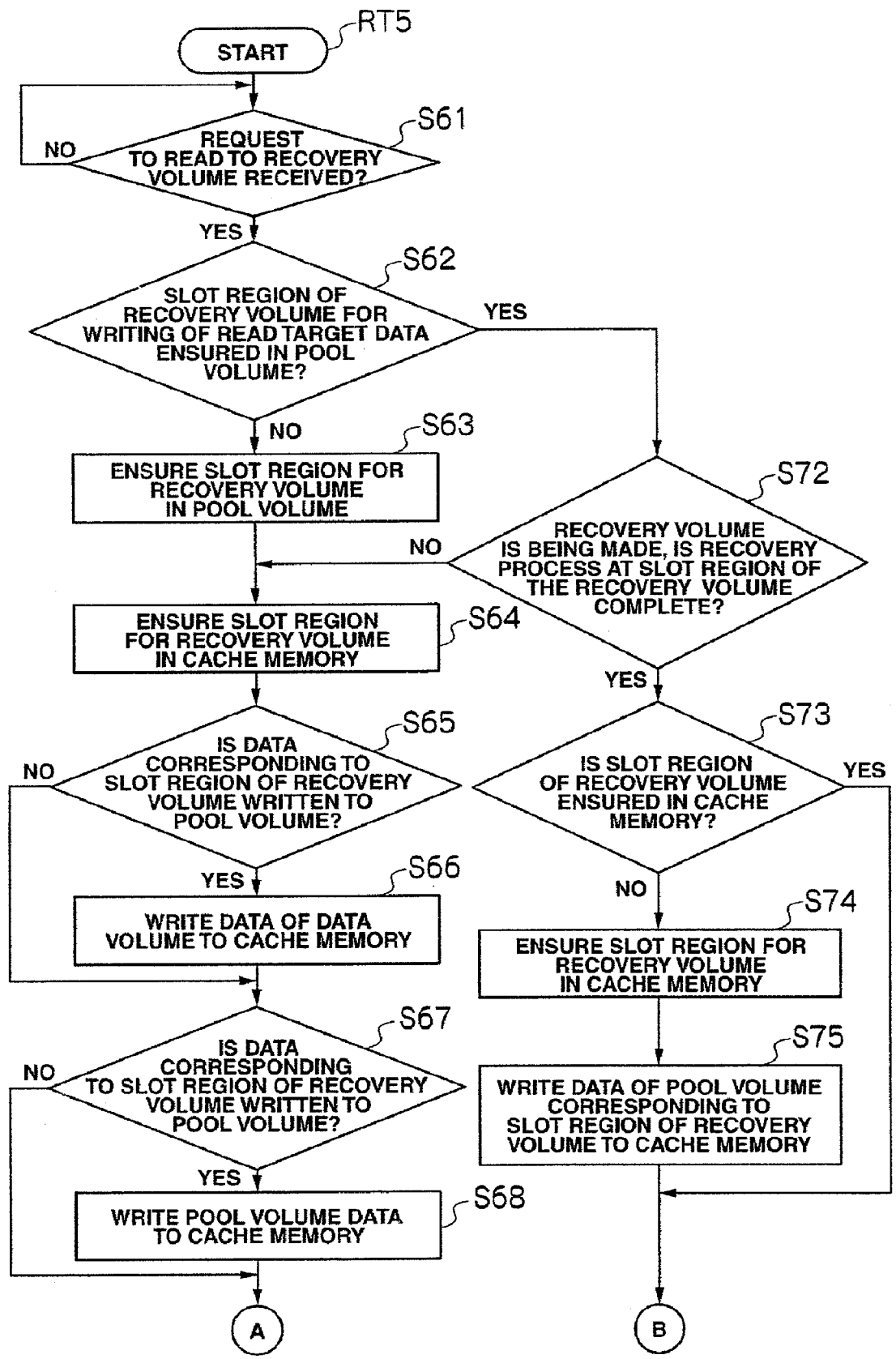
FIG. 22 is a further flowchart illustrating recovery volume read processing.
Figure 23:
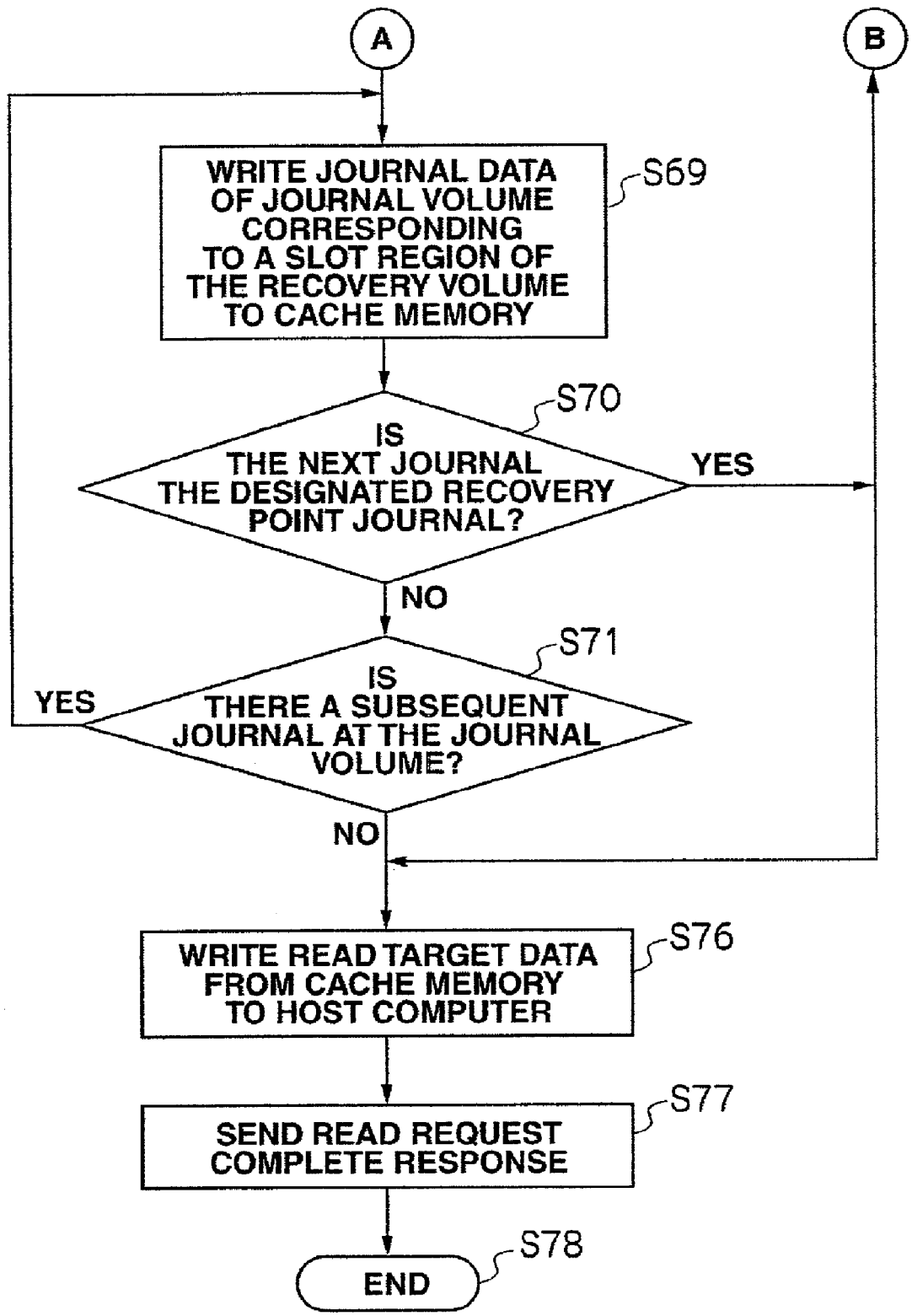
FIG. 23 is a further flowchart illustrating recovery volume read processing.
Figure 24:
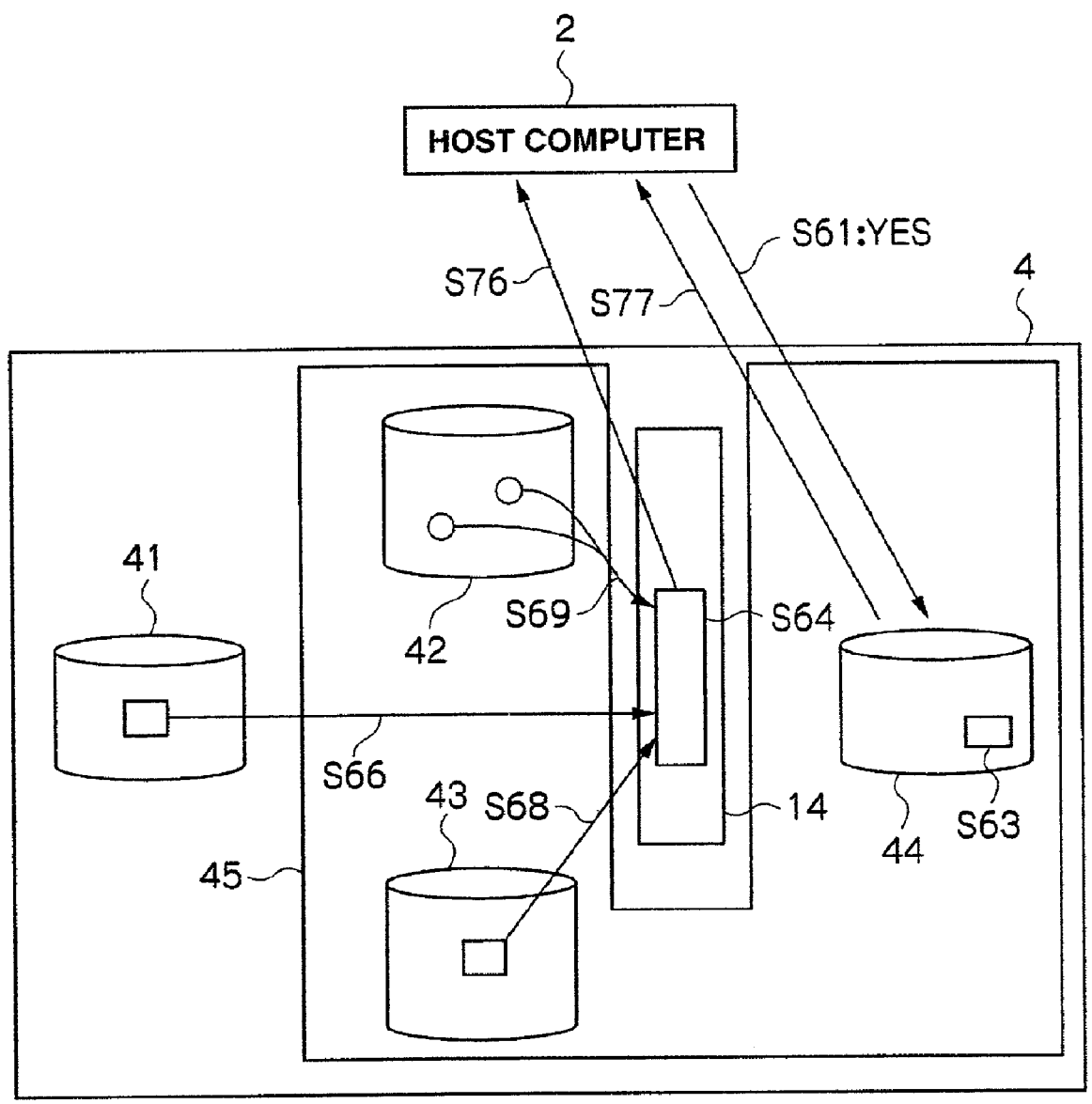
FIG. 24 is an outline view showing an outline of content of this recovery volume read processing.

A description is now given of recovery volume read processing for reading out data of a read out target from the recovery volume 44 based on a read request from host computer 2 of the storage system 4 to the recovery volume 44 of this embodiment. FIG. 22 and FIG. 23 are flowcharts showing a specific processing procedure relating to the recovery volume read processing of this storage system 4. Further, FIG. 24 is an outline view showing an outline of content of this recovery volume read processing.

A channel adapter 11 waits in standby mode for the receipt of a read request to the recovery volume 44 from host computer 2 in a standby state in accordance with a recovery volume read out processing procedure RT5 shown in FIG. 22 and FIG. 23 by executing the recovery management program 39 at the time of initialization (S61).

When a request to read to the recovery volume 44 is received from host computer 2 (S61: YES), the channel adapter 11 checks whether or not a slot region for the recovery volume 44 for writing the read target data is ensured in the pool volume 45 (S42). In the event that a slot region of the recovery volume 44 for writing the read out target data is not ensured in the pool volume 45 (S42: NO), in FIG. 19 and FIG. 20, the channel adapter 11 executes the same processing as for step S43 to step S55 of the recovery volume write processing procedure RT4 described above in FIG. 19 and FIG. 20 (S63 to SP75).

In the event that the next journal is a recovery point journal 230 designated by a recovery volume production request (S50: YES), there is no subsequent journal in the journal volume 42 (S51: NO), or in the event that data for the pool volume 45 corresponding to the slot region of the recovery volume 44 is written to the cache memory 14 (S75), the channel adapter 11 sends data of the read out target written to the region corresponding to the slot region of the recovery volume 44 of the cache memory 14 from the cache memory 14 to the host computer 2 (S76).

The channel adapter 11 then sends the read request completion response for the recovery volume 44 to the host computer 2 (S77). After this, the channel adapter 11 then completes the recovery volume read processing procedure RT5 shown in FIG. 22 and FIG. 23 (S78).

(2-5) Journal Deletion Processing of this Embodiment

Figure 25:
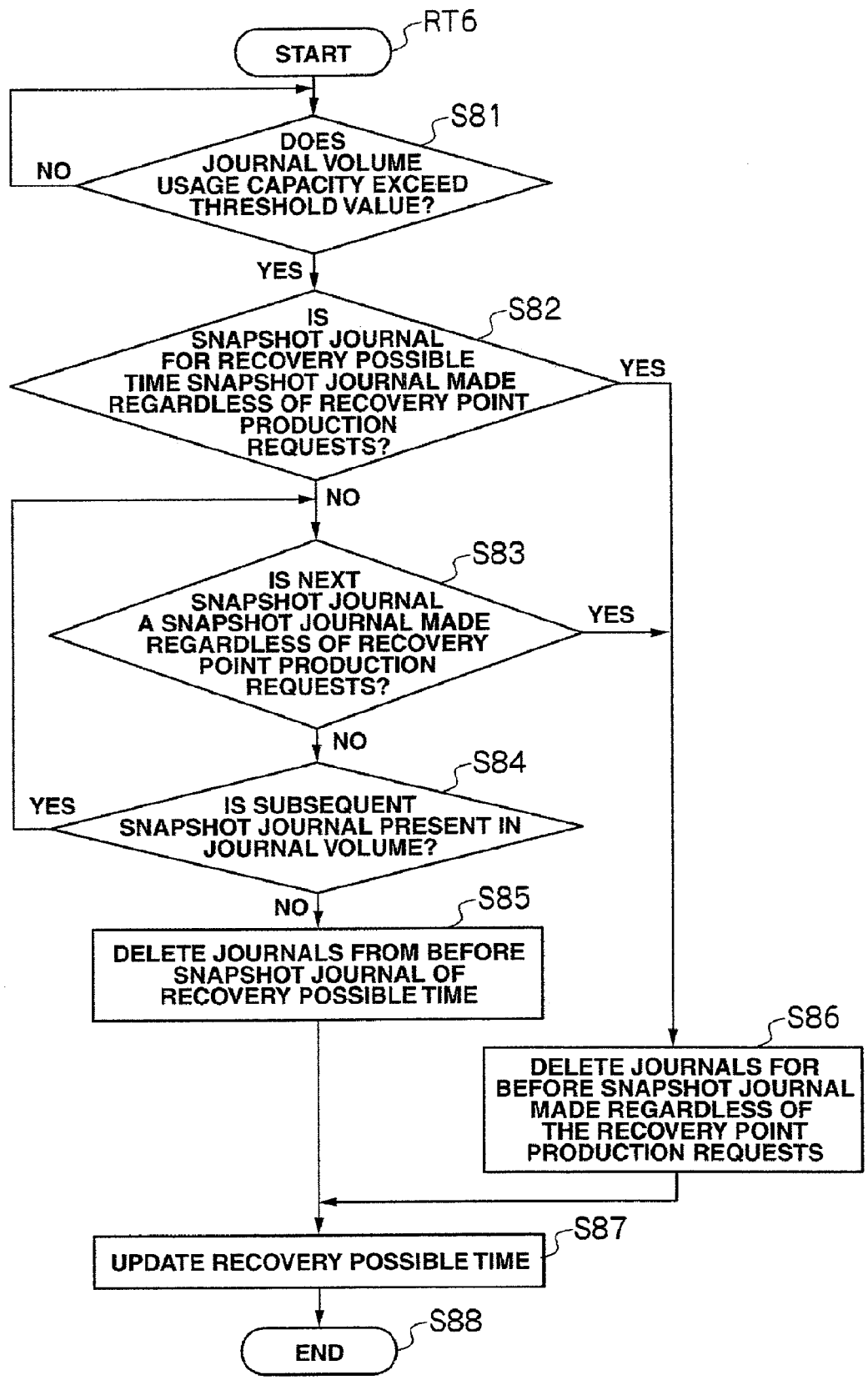
FIG. 25 is a flowchart illustrating journal deletion processing.

Next, a description is given of journal deletion processing for deleting a journal within a journal volume 42 of the storage system 4 in this embodiment. FIG. 25 is a flowchart showing a specific processing procedure relating to the journal deletion processing of this storage system 4.

By executing a journal control program 35 at the time of initialization, the channel adapter 11 waits in standby mode for the usage capacity of the journal volume 42 to exceed the predetermined threshold value, in accordance with the journal deletion processing procedure RT6 shown in FIG. 25 (S81). In this event, the channel adapter 11 is capable of recognizing the total usage capacity of the journal 210, snapshot journal 220, and recovery point journal 230 within the journal volume 42 and is capable of setting a predetermined threshold value in advance.

When the usage capacity of the journal volume 42 exceeds the predetermined threshold value (S81: YES), the channel adapter 11 refers to the recovery point management table 36, and checks whether or not the recovery point journal 230 corresponding to the time of the recovery possible time 57 of the recovery volume configuration information 31 is the recovery point journal 230 made without a recovery point production request from the host computer 2 (S82).

In the event that the recovery point journal 230 corresponding to the time of the recovery possible time 57 of the recovery volume configuration information 31 is not the recovery point journal 230 made without a recovery point production request from the host computer 2 (S82: NO), the channel adapter 11 checks whether or not the recovery point journal 230 is the recovery point journal 230 made without a recovery point production request from the host computer 2 (S83).

In the event that the next recovery point journal 230 is not a recovery point journal 230 made without a recovery point production request from the host computer 2 (S83: NO), the channel adapter 11 checks whether or not there is a subsequent recovery point journal 230 in the journal volume 42 (S84). In the event that there is a subsequent recovery point journal 230 in the journal volume 42 (S84: YES), the channel adapter 11 again checks after this whether or not the next recovery point journal 230 is a recovery point journal 230 made without a recovery point production request from the host computer 2 (S83), with the same processing then being repeated after this (S83, S84).

With regard to this, in the event that there is no subsequent recovery point journal 230 in the journal volume 42 (S84: NO), the channel adapter 11 deletes journals for before the recovery point journal 230 corresponding to the time of the recovery possible time 57 of the recovery volume configuration information 31 (S85).

Next, in the event that the recovery point journal 230 corresponding to the time of the recovery possible time 57 of the recovery volume configuration information 31 is the recovery point journal 230 made without a recovery point production request from the host computer 2 (S82: YES), or in the event that the recovery point journal 230 is a recovery point journal 230 made without a recovery point production request from the host computer 2 (S83: YES), the channel adapter 11 deletes journals for before the recovery point journal 230 was made regardless of the recovery point production requests (S86).

The channel adapter then updates the recovery possible time 57 of the recovery volume configuration information 31 to the corresponding time of the recovery point journal 230 (S87). After this, the channel adapter 11 then completes the journal deletion processing procedure RT6 shown in FIG. 25 (S88).

In this way, at the channel adapter 11, when a predetermined threshold value set in advance is exceeded, a recovery point journal 230 is made based on recovery point production requests from the host computer and a recovery point journal 230 is made regardless of the recovery point production requests from the host computer 2 are identified. By then deleting the recovery point journal 230 made without a recovery point production request from the host computer 2, and deleting journals for before the recovery point journal 230 for the recovery possible time 57 of the recovery volume configuration information 31 onwards, at the recovery possible time 57 of the recovery volume configuration information 31, it is possible to effectively prevent a situation where it is not possible to obtain the recovery point journal 230 made based on recovery point production requests from host computer 2 from happening, capacity of the journal volume 42 can be released, and it is possible to provide a substantially more reliable storage system 4 for the host computer 2.

In this way, at the storage system 1, when a recovery volume instructed from host computer 2 is made, a snapshot management table 33 corresponding to a snapshot journal 220 that is closest to the designated recovery point journal for before the designated recovery point journal 230 is duplicated, and a recovery volume 44 is made by updating the snapshot management table 33 based on journal data 214 written to the journal volume 42 for from the snapshot journal 220 up to the designated recovery point journal 230.

Therefore, at the storage system 1, it is possible to make a recovery volume 44 by ensuring a physical storage region for the journal data portion written to the journal volume 42 from the snapshot journal 220 to the designated recovery point journal 230 without ensuring a physical storage region for the data portion written to the data volume 41 and the snapshot volume 43.

Further, at the storage system 1, it is possible to produce any number of recovery volumes 44 from the same snapshot management table 33 without damaging the snapshot management table 33 because a snapshot management table 33 that is before the designated recovery point journal 230 and corresponds to the closest snapshot journal 220 to the designated recovery point journal 230 is duplicated.

In this embodiment, a description is given of the case where a journal is written at the journal volume 42 for data written to the data volume 41 so as to acquire a snapshot volume 43 for the data volume 41 but the present invention is by no means limited in this respect, and may also be applied to other various forms of the storage system 1.

Figure 26:
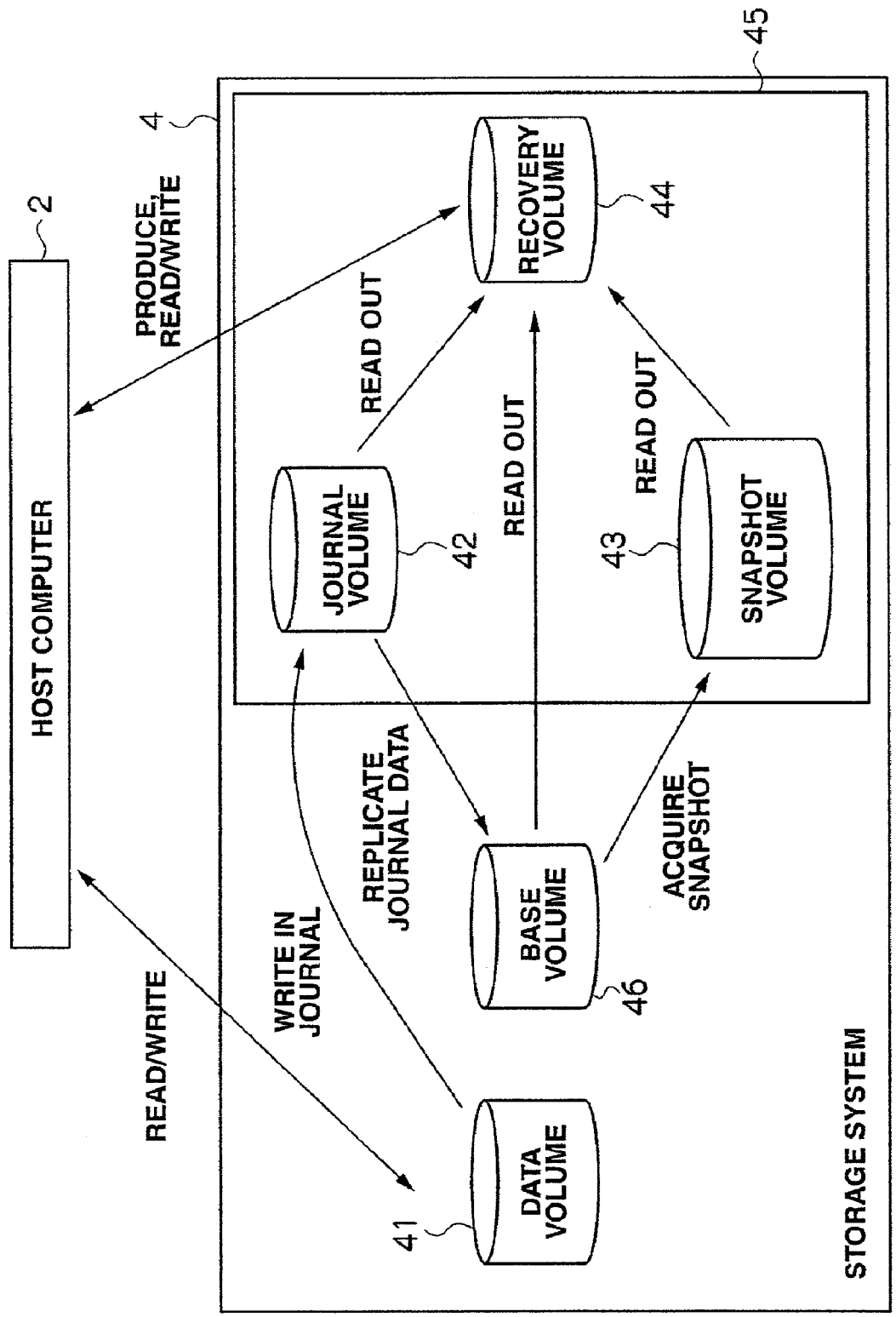
FIG. 26 is an outline view illustrating the configuration of a logical volume of a further embodiment. 8

For example, with this storage system 1, as shown in FIG. 26, a replication of a data volume is made by copying journal data 214 contained in the journal 210 of the journal volume 42 to the base volume 46. When a snapshot production request is then received from the host computer 2, it is also possible to obtain a snapshot volume 43 of the base volume 46 rather than of the data volume 41. This means that it is possible to improve responsiveness of the storage system 1 with respect to the host computer 2 and to improve reliability of the storage system 4 because the number of accesses to the data volume 41 is reduced.

Figure 27:
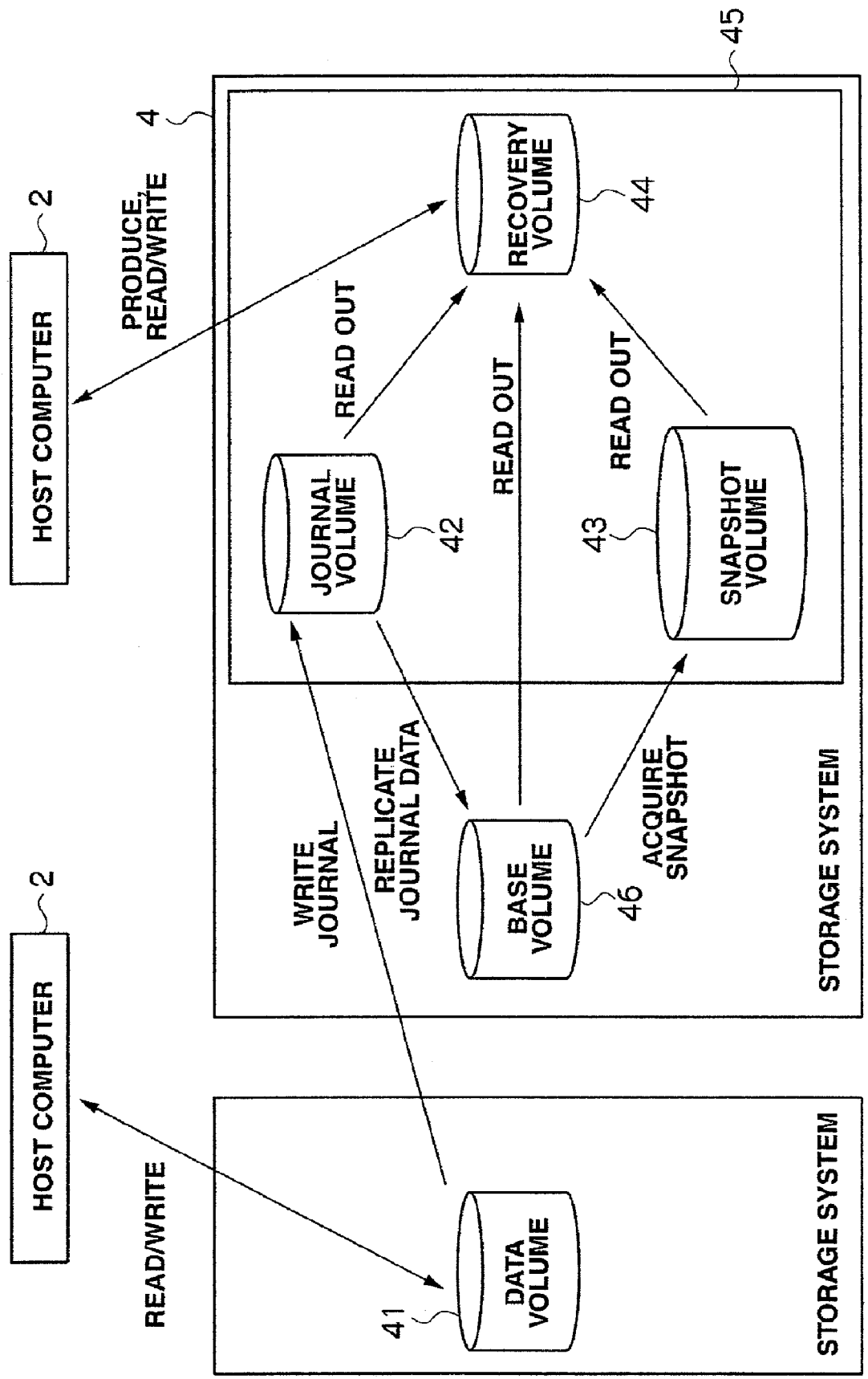
FIG. 27 is a further outline view illustrating the configuration of a logical volume of a further embodiment.

Further, with the storage system 1, application of the present invention is by no means limited to within a single storage system 4, and the present invention may be applied between two storage systems 4. For example, at the storage system 1, as shown in FIG. 27, a data volume 41 is provided at one storage system 4, while a journal volume 42, snapshot volume 43, recovery volume 44, pool volume 45 and base volume are provided at another storage system 4. In this event, at the storage system 1, it is possible to implement the present invention by transferring data written to the data volume 41 using a remote copy function etc., and writing this data as a journal to the journal volume 42. The remote copy function is a function for copying data written to the logical volume of one storage system to the logical volume of the other storage system, so as to double the data.

Figure 28:
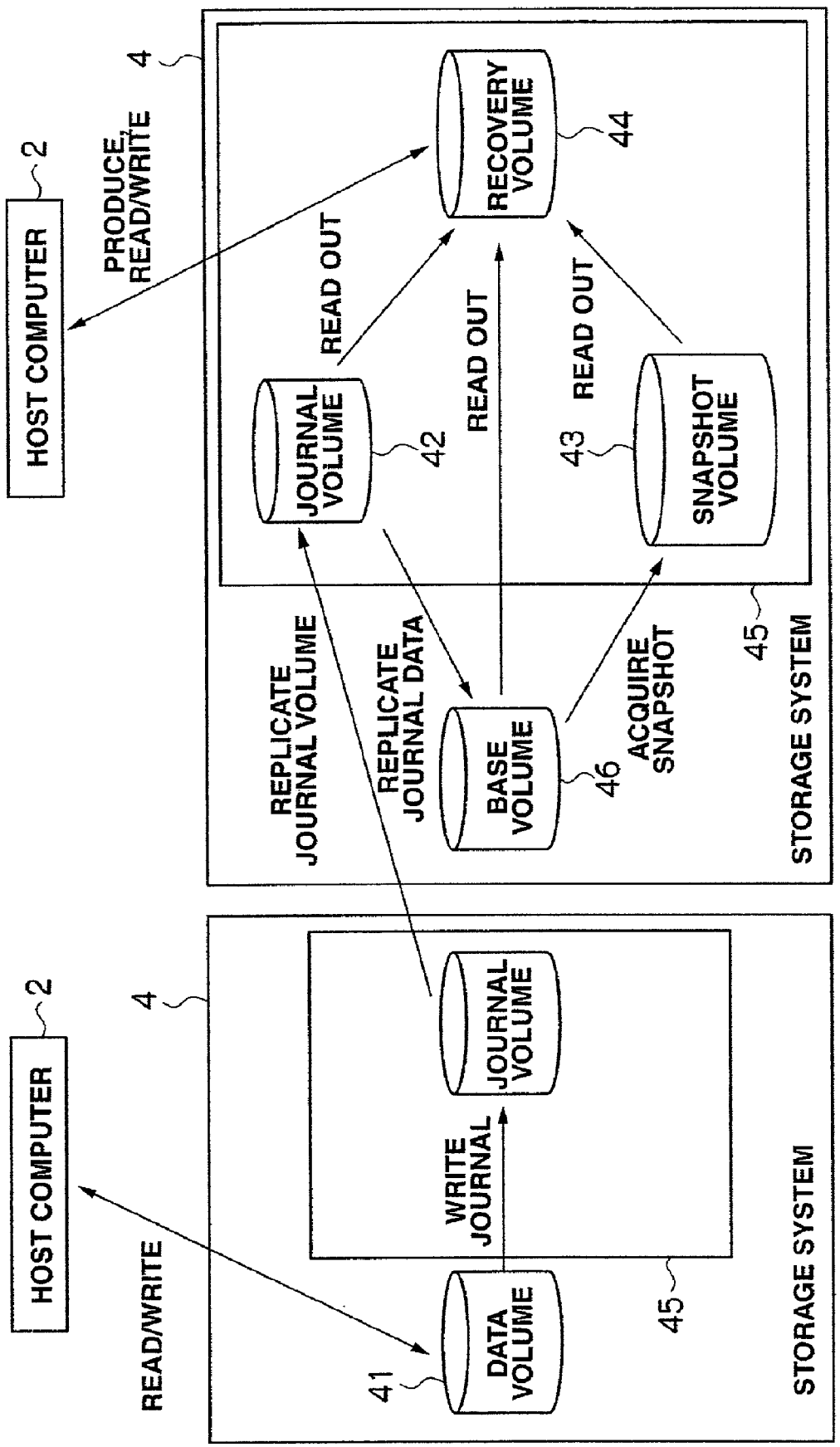
FIG. 28 is a still further outline view illustrating the configuration of a logical volume of a still further embodiment.

Further, at the storage system 1, for example, as shown in FIG. 28, the data volume 41, journal volume 42 and pool volume 45 are provided at the one storage system 4, while a journal volume 42, snapshot volume 43, recovery volume 44, pool volume 45, and base volume are provided at the other storage system 4. In this event, at the storage system 1, the present invention is implemented by data written to a journal volume 42 of one storage system 4 being transferred by a remote copy function etc., and written as a journal to the journal volume 42 of the other storage system 4. As a result, at the storage system 1, it is possible to improve the responsiveness with respect to the host computer 2 because the series of processes of writing data of the write target to the data volume 41, and writing data etc. written to the data volume 41 to the journal volume 42 as a journal can be concluded at the other storage system 4.

The present invention is applicable to various apparatuses having snapshot functions and journal functions.

What is claimed is:

1. A storage system coupled to a computer comprising:
 a controller coupled with a first storage system and a second storage system, wherein the controller is configured to:
 set a first storage region of the first storage system to which first data sent from the computer is written by the controller;
 set a second storage region of the second storage system to which second data written into the first storage region is written, as journal data, in a manner where the journal data can be identified in chronological order;
 set a third storage region of the second storage system to which the second data of the first storage region is written by the controller, if the controller has received a write request from the computer;
 acquire a snapshot of the first storage region at a predetermined time;
 write a snapshot journal of the snapshot into the second storage region;
 manage a management table of the snapshot;
 acquire a recovery point journal to be used to create a virtual recovery volume designated by the computer;
 write the recovery point journal into the second storage region;
 replicate, upon creating the virtual recovery volume, the management table of the snapshot corresponding to the snapshot journal that is chronologically before the recovery point journal corresponding to the designated virtual recovery volume; and
 create the virtual recovery volume by updating the management table replicated with a snapshot management table replication unit based on the journal data written into the second storage region from the snapshot journal up to the recovery point journal corresponding to the designated virtual recovery volume.

2. The storage system according to claim 1, wherein the controller selects and reads from either the first storage region or the second storage region if the controller receives a read request for the virtual recovery volume from the computer.

3. The storage system according to claim 1, further comprising a recovery volume production section configured to:
 update the snapshot management table by changing an address managed in the snapshot management table to an address where the journal data from the snapshot journal to the designated virtual recovery volume written into the second storage region has been written.

4. The storage system according to claim 3, wherein if there is a write request from the computer for writing data into the virtual recovery volume, the virtual recovery volume production section newly allocates a storage region to the virtual recovery volume and writes the data sent from the computer therein.

5. The storage system according to claim 4, wherein if there is a write request for writing data into the virtual recovery volume during the production of the virtual recovery volume, the virtual recovery volume production section sequentially writes the journal data, which was written into the second storage region corresponding to an address of the write request, into a storage region corresponding to the address and, after the writing of the journal data that was written into the second storage region corresponding to the address is complete, writes the data sent from the computer into the storage region corresponding to the address.

6. The storage system according to claim 5, wherein if there is a read request for reading data from the virtual recovery volume during the production of the virtual recovery volume, the virtual recovery volume production section sequentially writes the journal data, which was written into the second storage region corresponding to an address of the write request, into a storage region corresponding to the address and, after the writing of the journal data that was written into the second storage region corresponding to the address is complete, reads out the journal data written into the storage region corresponding to the address to the computer.

7. The storage system according to claim 6, further comprising a recovery point acquisition section configured to:
 create a second recovery point journal prior;
 create a first recovery volume based on a second request from the computer;
 identify and acquire the first recovery volume and the second recovery point journal, wherein the second recovery point journal is created prior to the second request from the computer; and
 wherein the storage system further comprises:
 a threshold value setting section for setting a threshold value of a usage capacity of the second storage region to a predetermined threshold value in advance;
 a recoverable time management section for managing a recoverable time as an oldest time that the virtual recovery volume can be created; and
 a journal deletion section for deleting the journal data that is closest to the recoverable time yet earlier than the second recovery point journal, the snapshot journal and the recovery point journal from the second storage region if the threshold value set with the threshold value setting section is exceeded.

8. A virtual recovery volume production method of a storage system for writing data sent from a computer into a first storage system, comprising:
 a first step of setting a first storage region of the first storage system to which the data sent from the computer is written by a controller coupled with the first storage region, a second storage region of a second storage system to which the data written into the first storage region is written as journal data in a manner where the journal data can be identified in chronological order, and a third storage region of the second storage system to which the data of the first storage region is written by the controller, if the controller has received a write request from the computer;
 a second step of creating and acquiring a snapshot of the first storage region at a predetermined time, and writing a snapshot journal of the snapshot into the second storage region, and managing a management table of the snapshot;

a third step of creating and acquiring a recovery point journal to be used to create a virtual recovery volume designated by the computer, and writing the recovery point journal into the second storage region;

a fourth step of replicating, upon creating the virtual recovery volume, the management table of the snapshot corresponding to the snapshot journal that is chronologically before the recovery point journal corresponding to the designated virtual recovery volume; and a fifth step of creating the virtual recovery volume by updating the management table replicated with a snapshot management table replication unit based on the journal data written into the second storage region from the snapshot journal up to the recovery point journal corresponding to the designated virtual recovery volume.

9. The virtual recovery volume production method of a storage system according to claim 8, wherein, at the fifth step, the snapshot management table is updated by changing an address managed in the snapshot management table to an address in which the journal data, from the snapshot journal to the designated virtual recovery volume and written into the second storage region, is written therein.

10. The virtual recovery volume production method of a storage system according to claim 8, wherein, at the fifth step, if there is a write request from the computer for writing data into the virtual recovery volume, a storage region is newly allocated to the virtual recovery volume and the data sent from the computer is written therein.

11. The virtual recovery volume production method of a storage system according to claim 8, wherein, at the fifth step, if there is a write request for writing data into the virtual recovery volume during the production of the virtual recovery volume, the journal data, which was written into the second storage region corresponding to an address of the write request, is sequentially written into a storage region corresponding to the address and, after the writing of the journal data that was written into the second storage region corresponding to the address is complete, the data sent from the computer is written into the storage region corresponding to the address.

12. The virtual recovery volume production method of a storage system according to claim 8, wherein, at the fifth step, if there is a read request for reading data from the virtual recovery volume during the production of the virtual recovery volume, the journal data, which was written into the second storage region corresponding to an address of the write request, is sequentially written into a storage region corresponding to the address and, after the writing of the journal data that was written into the second storage region corresponding to the address is complete, the journal data written into the storage region corresponding to the address is read out to the computer.

13. The virtual recovery volume production method of a storage system according to claim 8, wherein, at the third step, a first recovery volume that is created based on a request from the computer and a second recovery point journal that is created prior to the request from the computer are identified and acquired; and wherein the virtual recovery volume production method of a storage system further comprises:

a threshold value setting step of setting a threshold value of a usage capacity of the second storage region to a predetermined threshold value in advance;

a recoverable time management step of managing a recoverable time as an oldest time that the virtual recovery volume can be created; and a journal deletion step of deleting the journal data that is closest to the recoverable time yet earlier than the second recovery point journal, the snapshot journal and the recovery point journal from the second storage region if the threshold value set at the threshold value setting step is exceeded.

* * * * *